(12) United States Patent
Shiffer et al.

(10) Patent No.: US 8,949,257 B2
(45) Date of Patent: Feb. 3, 2015

(54) METHOD AND SYSTEM FOR COLLECTING AND ORGANIZING DATA CORRESPONDING TO AN EVENT

(75) Inventors: Jason Shiffer, Vienna, VA (US); Matthew Frazier, New York, NY (US); Sean Cunningham, Washington, DC (US); Scott Hogsten, West Jefferson, OH (US); Eric Helvey, Alexandria, VA (US); James Butler, Washington, DC (US); Peter Villadsen, Holly Springs, NC (US)

(73) Assignee: Mandiant, LLC, Milpitas, CA (US)

( * ) Notice: Subject to any disclaimer, the term of this patent is extended or adjusted under 35 U.S.C. 154(b) by 781 days.

(21) Appl. No.: 12/024,852

(22) Filed: Feb. 1, 2008

(65) Prior Publication Data

US 2009/0198670 A1 Aug. 6, 2009

(51) Int. Cl.
*G06F 7/00* (2006.01)
*G06F 17/30* (2006.01)

(52) U.S. Cl.
CPC .... *G06F 17/30312* (2013.01); *G06F 17/30675* (2013.01); *G06F 17/30424* (2013.01); *G06F 17/30321* (2013.01)
USPC .......................................................... 707/756

(58) Field of Classification Search
USPC .................. 707/742, 746, 729, 671, 710, 653
See application file for complete search history.

(56) References Cited

U.S. PATENT DOCUMENTS

| | | | | |
|---|---|---|---|---|
| 2003/0126433 A1* | 7/2003 | Hui | | 713/158 |
| 2004/0015582 A1* | 1/2004 | Pruthi | | 709/224 |
| 2005/0278534 A1* | 12/2005 | Nadalin et al. | | 713/175 |
| 2006/0107036 A1* | 5/2006 | Randle et al. | | 713/153 |
| 2006/0143442 A1* | 6/2006 | Smith | | 713/156 |
| 2006/0195430 A1* | 8/2006 | Arumainayagam et al. | | 707/3 |
| 2007/0192253 A1* | 8/2007 | Gill et al. | | 705/51 |
| 2007/0260520 A1* | 11/2007 | Jha et al. | | 705/14 |
| 2008/0005086 A1* | 1/2008 | Moore | | 707/3 |
| 2009/0089359 A1* | 4/2009 | Siorek et al. | | 709/202 |

OTHER PUBLICATIONS

Lynch, Clifford A. "When Documents Deceive: Trust and Provenance as New Factors for Information Retrieval in a Tangled Web" 2001, Journal of the American Society for Information Science and Technology, vol. 52, No. 1, pp. 12-17.*

* cited by examiner

*Primary Examiner* — James E Richardson
(74) *Attorney, Agent, or Firm* — Polsinelli PC; Adam C. Rehm

(57) ABSTRACT

A system and method for analyzing data from a plurality of computer environments. The computer environments are authenticated and data is imported to a memory location. The data is converted into a uniform format to enable expedited searching by one or more authenticated users. The data may be marked so that a user may determine which computer environment provided the data. The system may also create one or more indexes of the data to assist one or more users in searching the data.

33 Claims, 21 Drawing Sheets

```
<xml version ="1.0" encoding =utf-8"?>
<resource name ="File Audit API " xsi:type="Job" href ="/workspaces /1/jobs/all/57/" created ="2007-08-
10T15:15:41.432309Z" updated ="2007-08-10T16:50:29.076104 Z" author="Meggin" updater ="Meggin"
mime_type ="application /vnd.mandiant.job+xml">
  <schedule >now</schedule >
  <opaque_data />
  <input >
    <uri>/workspaces /1/hosts/all/2/</uri>
  </input >
  <script chaining ="implicit " id="urn:uuid:066fe62d-2eb1-4b16-b21b-aca1bddb5686 ">
    <commands >
      <command id ="urn:uuid:686727af-a90f-4ff2-a286-37bd44a9ffbc "
        xsi:type="AuditHostScriptCommand ">
        <input >
          <type>application /vnd.mandiant.host+xml</type>
        </input >
        <result >
          <type>application /vnd.mandiant.auditresult +xml</type>
        </result >
        <script chaining ="none" id="urn:uuid:9f6bb9e0-4c2a-473d-ac65-ec5c31453cfb">
          <commands >
            <command id ="urn:uuid:bef018b8-4bdb-4a5a-8a7f-b79c7eeac939"
              xsi:type="ExecuteModuleCommand ">
              <module name ="w32apifiles " version ="1.0.11.0"/>
              <config xsi:type="ParameterListModuleConfig ">
                <parameters >
                  <param name ="Path">
                    <value xsi:type="xsd:string">c:\</value >
                  </param >
                  <param name ="Wildcard">
                    <value xsi:type="xsd:string">**\*.exe</value >
                  </param >
                  <param name ="Depth">
                    <value xsi:type="xsd:int">4</value >
                  </param >
                </parameters >
              </config>
            </command >
          </commands >
        </script >
      </command >
    </commands >
  </script >
  <active xsi:nil="true" />
  <schedule >now</schedule >
</resource >
```

Fig. 11

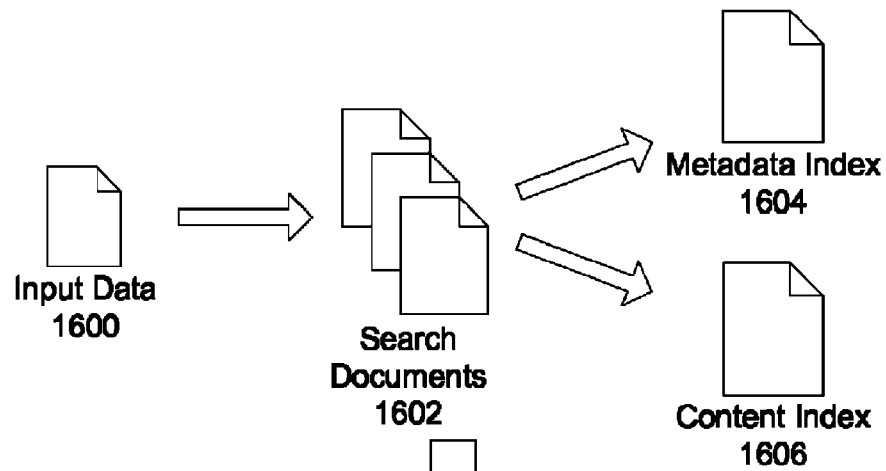
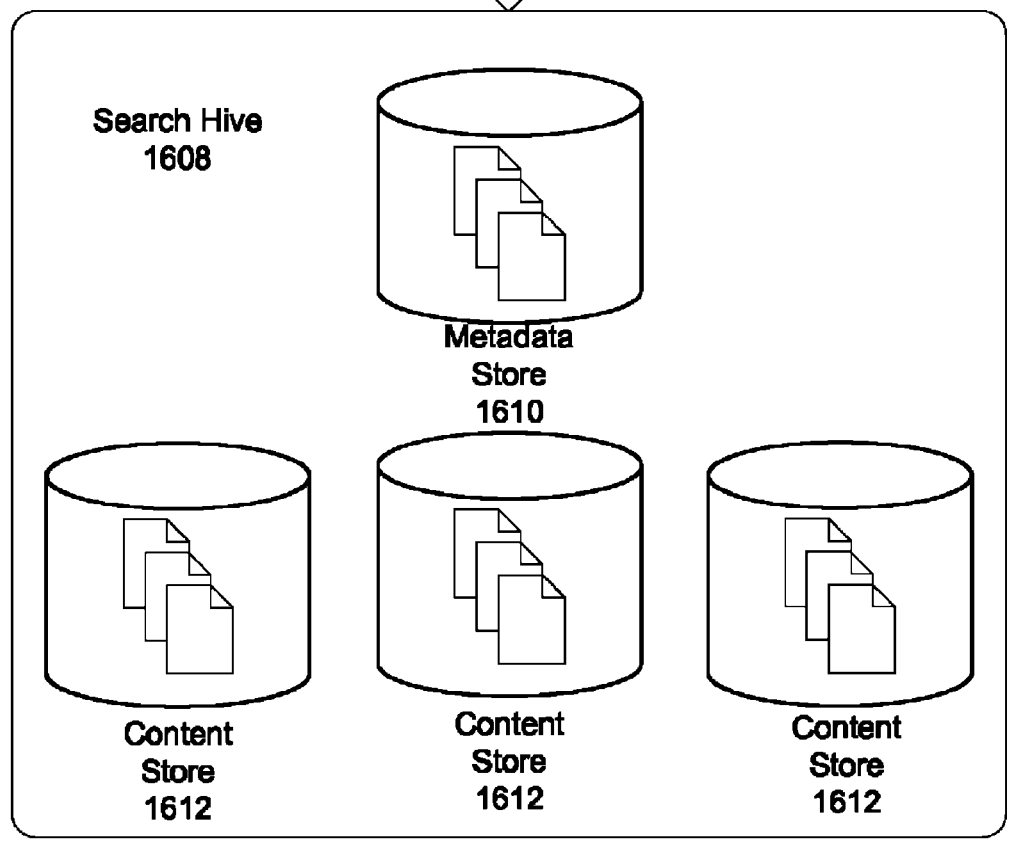
Fig. 16

Columns show which row items have been individuall marked with Labels

| | Device Path | Malware | Reviewed | Path | Size |
|---|---|---|---|---|---|
| File List: host1.bar.com | \Device\HarddiskVolume1 | x | x | c:\windows\system32\alg.exe | 44544 |
| File List: host2.bar.com | \Device\HarddiskVolume1 | | x | c:\windows\system32\alrsvc.dll | 17408 |
| File List: host3..bar.com | \Device\HarddiskVolume1 | | x | c:\windows\system32\amcompat.tlb | 16832 |
| File List: host4.bar.com | \Device\HarddiskVolume1 | x | | c:\windows\system32\amstream.dll | 70656 |
| | \Device\HarddiskVolume1 | | | c:\windows\system32\ansi.sys | 9029 |
| | \Device\HarddiskVolume1 | | | c:\windows\system32\apcups.dll | 102912 |
| | \Device\HarddiskVolume1 | | | c:\windows\system32\append.exe | 12498 |
| | \Device\HarddiskVolume1 | | | c:\windows\system32\apphelp.dll | 126976 |

Labels
Audits
Case Notes
Hosts
Jobs

METHOD AND SYSTEM FOR COLLECTING AND ORGANIZING DATA CORRESPONDING TO AN EVENT

BACKGROUND OF THE INVENTION

As more businesses and governmental entities increasingly rely on computer networks to conduct their operations and store relevant data, security of these networks has become increasingly important. The need for increased security is emphasized when these networks are connected to non-secure networks such as the Internet. The preservation of important data and the ability to retrieve the data in the aftermath of a security breach has become the focus of network administrators.

Another concern for network administrators is the retrieval, searching, sorting, and copying of relevant electronic data for use in legal procedures, such as responses to subpoenas. Many companies, especially large companies, routinely receive legal document requests as part of civil or criminal proceedings. Fulfilling the company's duty to respond to these requests typically requires the company to search not only their paper documents, but their electronic data such as e-mail, word processing files, spreadsheets, databases, and images as well. This process of gathering, searching, sorting, and copying electronic data without damaging the original data can be extremely expensive and time-consuming.

Electronic data, such as word processing documents, may also include metadata, which is information about the electronic data such as creation date and time or revision history. Searching, sorting, and copying of metadata presents an additional challenge to companies preparing to respond to legal process or recover from a security breach.

Various technologies may be employed to aid in the processing and classification of data, including search technologies, software that copies the entire contents of the hard drive in a computer system, and software that allows an analyst to review its contents and categorize it based on their observations. But existing solutions address only subsets of the problem, such as collection, analysis, or reporting, and fail to fully encompass the process of collection, analysis/minimization, and reporting. Thus, network administrators must employ multiple technologies at each phase and sometimes manually handle the transfer of data between the phases. For example, one technology might be used to image a system hard drive or obtain a process list, while an entirely different technology is used to review that information. This results in increased costs and time delays, which are undesirable in both data production and security breach recovery processes.

Thus there exists a need for additional technologies to manage the entire data production and security breach recovery processes in a fashion that controls costs and reduces risk.

SUMMARY OF THE INVENTION

In response to this need, the present application describes a method and system for data preservation and retrieval. A method according to the present invention provides for the identification, collection, analysis and reporting of information necessary to resolve a computer security incident or data request incident. The method and system employ techniques to model and organize data such that it allows for precision acquisition of information to resolve an incident, analysis of that data after acquisition, and reporting on conclusions reached during analysis. Furthermore, methods are provided to support collaboration across each phase of the process.

In accordance with an embodiment of the invention, data can be organized and presented in response to an event comprising authenticating a plurality of memory sources, importing stored data from a plurality of memory sources into a first memory, converting the stored data into a specified format to produce uniform data, providing an interface to a user through which the user may access the uniform data, and presenting one or more subsets of the uniform data to the user in response to a request from the user.

The plurality of memory sources can be coupled to the first memory through a network such as, for example, the Internet. The plurality of memory sources can be servers or disk drives. The specified format can be extensible markup language or plain text format.

The user can be allowed to search the uniform data through the interface. The interface can be provided on a computer coupled to a network and the first memory is also coupled to the network. The uniform data can be stored in a database. The stored data can be both content and metadata.

The interface can be provided to a plurality of users through a network such as, for example, the Internet.

In accordance with another embodiment of the invention, stored data can be analyzed by searching for a plurality of storage devices coupled to a network, copying the stored data on the plurality of storage devices to a memory location, converting the stored data to uniform data comprising a single format, providing an interface to a user through which the user may access the uniform data, and presenting one or more subsets of the uniform data to the user in response to a request from the user.

The plurality of storage devices can be servers or disk drives. The memory location can be a disk drive. The single format can be extensible markup language.

The user can be presented with a list of the plurality of storage devices coupled to the network and allowing the user to select which of the plurality of storage devices to copy stored data from.

The user can be presented with a list of data types present on the plurality of storage devices coupled to the network and allowing the user to select which of the data types to copy. The list of data types can be content and metadata.

The single format data can be added to a database. The user can be provided with access to the database through an interface.

In accordance with another embodiment of the invention, a system for analyzing data can include a means for searching a network for storage devices, means for identifying the storage devices to a user, means for allowing the user to choose selected storage devices, means for copying the data from the selected storage devices, and means for converting the data to a converted data having a single format, means for providing access to the user to the converted data for analysis.

In accordance with an embodiment of the invention data can be searched using one or more indexes comprising identifying a plurality of computer environments coupled to a network, searching the plurality of computer environments for data that matches a first predetermined criterion, copying the matching data to a memory location, converting the matching data to a uniform format, creating one or more indexes of the matching data, and providing an interface to a user that allows the user to search the matching data using the one or more indexes.

The creating one or more indexes of the matching data can be creating one or more search documents containing information about the matching data. The one or more search documents can be created in a predetermined format. The search documents can be stored in a database.

In an embodiment, creating one or more indexes of the matching data can include searching the matching data for particular term and creating a search document including a list of documents containing the particular term. The list of documents containing the particular term can include the storage location of those documents. The one or more indexes can rank a plurality of particular terms based on the relevance of the particular terms.

In an embodiment, creating one or more indexes can include creating an index of content and an index of metadata or indexing only a predetermined portion of a document. The predetermined portion can be the title.

In accordance with an embodiment, the creating one or more indexes can include indexing only a predetermined file type.

Documents can be ranked in an index based on predetermined criteria. The predetermined criteria can be the number of times a particular document has been viewed.

In accordance with another embodiment of the invention, files can be searched by identifying a plurality of computer environments coupled to a network, searching the plurality of computer environments for files that match a predetermined criteria, converting matching files to a predetermined format, creating one or more indexes of the matching files, and providing an interface to a user allowing the user to search the matching files using the one or more indexes. The predetermined criteria can be a file type.

The one or more indexes can include a content index or a metadata index. An index can contain each word included in each file. The index can include predetermined terms. The index can include each file containing predetermined terms and the storage location of that file.

The creating of one or more indexes of matching files can include creating a search document for each matching file containing data about each matching file. The terms can be ranked in an index.

In accordance with another embodiment of the invention, a system for searching data can include a means for identifying a plurality of computer environments coupled to a network, means for searching the plurality of computer environments for data, means for copying the data to a memory location, means for creating one or more indexes of the data, and means for searching the data using the one or more indexes.

In accordance with an embodiment of the invention, data can be collected by identifying a plurality of computer environments coupled to a network, searching the plurality of computer environments for data that matches a first predetermined criterion, copying matching data to a memory location, creating one or more indexes of the matching data, and updating the indexes at a predetermined interval. The predetermined interval can be a time interval.

The updating of the indexes can include creating one or more new indexes based on recently discovered data, deleting one or more indexes based on recently deleted data, or creating one or more new indexes based on one or more searches requested by a user. The indexes may be updated by deleting one or more indexes based on one or more searches requested by the user. The deleting of one or more indexes based on one or more searches requested by the user can include deleting one or more indexes if the indexes have not been utilized by the system within a predetermined period of time.

The updating of the indexes at a predetermined interval can include merging two or more indexes.

In one embodiment, the updating of the indexes at a predetermined interval comprises creating a temporary index for a new amount of data when the new amount of data has been detected during the searching of the plurality of computer environments. Further, the temporary index can be merged into a second index once the temporary index has reached a predetermined size. The temporary index can be merged into a second index at a predetermined interval, such as a predetermined time interval.

In accordance with another embodiment of the invention, data in a computer environment can be searched by presenting a list of storage devices to a user, allowing the user to select storage devices, searching for stored data on the selected storage devices, creating a plurality of indexes of the stored data, and executing a search of the stored data based on the indexes. The user can be allowed to define a criteria and searching only for stored data on the selected storage devices that meet the criteria. The stored data can be copied to a single memory location.

The plurality of indexes can be tables which include a number of variables and the files in the stored data that correspond to the variables. The variables can be file types or file creation dates. The tables can further include the location of the stored data on the selected storage devices. The indexes can be saved to a storage device.

In an embodiment, the indexes are periodically updated upon the discovery of a predetermined amount of unindexed data.

In accordance with another embodiment of the invention a system for collecting data can include a means for identifying a plurality of computer environments coupled to a network, means for searching the plurality of computer environments for data that matches a first predetermined criterion, means for copying the matching data to a memory location, means for creating one or more indexes of the matching data, and means for updating the indexes at a predetermined interval.

The present invention discloses systems and methods for the preparation for an event, the initiation of a response to the event, collection of data, analysis of the data, organization and presentation of data, and resolution of the event.

BRIEF DESCRIPTION OF THE FIGURES

FIG. 11 depicts a document to be used with a system according to one embodiment of the present invention.

FIGS. 12-19 are flow diagrams depicting the steps of a method according to the present invention.

FIGS. 20-22 depict results presented to a user of analyses conducted by a system according to the present invention.

DETAILED DESCRIPTION OF THE PREFERRED EMBODIMENTS

Figure 1:
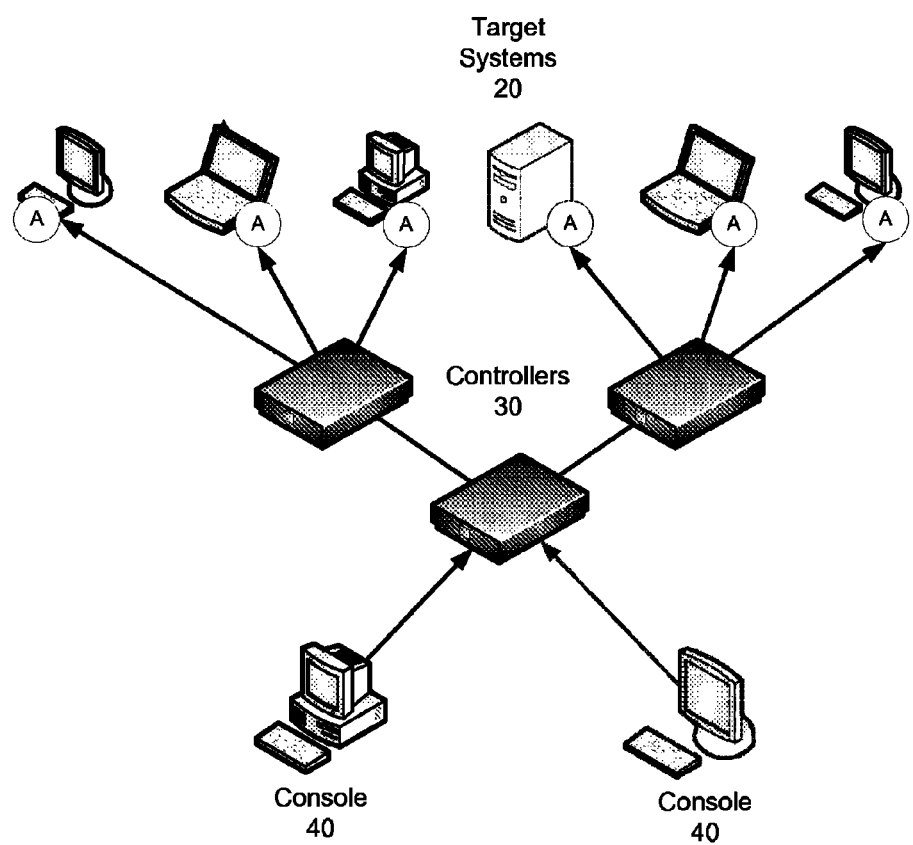
FIG. 1 depicts various components of the invention in one embodiment.

The present application describes a method and system for data preservation and retrieval. A method according to the present invention includes a number of steps. The initial step is preparation, which encompasses measures taken before an incident such as a request for production of data or a security breach occurs to ensure that the resources for responding to the incident have been identified, the assets such as data storage devices or networks have been identified, and potential actions to be taken in response to the incident have been outlined. The second step is initiation in which the incident is identified and the process is initiated. The third step is collection in which information such as data and metadata are collected. The data to be collected and the sources of the data must be identified. In the case of legal process, the data to be collected may be identified in a legal document such as a subpoena. The fourth step is the analysis of the data. This analysis may include sorting, searching, reviewing, and organizing the data. In the case of a security breach, the method used to conduct the breach must be determined and any damage caused by the breach must be evaluated. In the case of generating a response to legal procedures, all data that is responsive to the legal procedures must be identified and collected, while confidential data and non-responsive data must be segregated. The fifth step is presentation, in which the findings are presented to a user. In the case of a security breach, details of the security breach and identification of the damage are presented to a user. In the case of a response to legal process, the gathered information is presented to a user. The final step is resolution, in which the cause of any security breach is corrected to prevent future breaches or the user to which the documents are presented verifies that the project is complete.

Data gathered for security incident response and response to legal procedures may take many forms and may be gathered for many reasons. Documents and e-mail messages may be gathered to assess information sought by an attacker during a security breach, determine how a breach occurred, or determine whether an attacker has stored data on a system. Documents and e-mail messages may also be gathered as responsive to legal requests. Data concerning deleted files on certain storage devices may also be relevant to show deletions caused during a security breach or deletions of relevant material that must be retrieved to respond to legal process. Programs or processes used on a computer system may also be relevant to identify in response to legal process or to identify the source of particular relevant documents. Programs or processes may also dispel or confirm a suspicion that a security breach has occurred. An attacker may also install programs or processes that must be removed. Configuration data of a computer system or network may also be responsive to legal process or identify changes that an attacker has made during a security breach. Configuration data may also identify relevant components of a system that may contain data responsive to legal process, such as network drives or what types of information are stored on a system. Databases are important to reveal information that may have been accessed during a security breach, such as customer information or financial information. Databases may also contain relevant information that may be responsive to legal process.

The data necessary to respond to a security breach or legal process is potentially voluminous and takes many forms. This data may also be located on various different storage devices, which may make retrieval more difficult.

Once the data has been acquired, it must be analyzed to find the relevant pieces that confirm or dispel a security breach or answer a legal discovery request. There are many different techniques which may be used to analyze the data. Keyword searching may be used to find documents relevant to a particular topic in response to legal process or patterns of files relating to a particular topic. Certain keywords or byte patterns may be searched as indicators of compromise. For example, if an investigator identifies a specific module of malware and finds that a specific byte sequence occurs within memory when it is running, or within a file that contains the malware, searching for that byte sequence may be an important step in evaluating a security breach.

Various methods may be used to search for specific files in a computer system's memory or on its hard drive, including examination of portions of file contents or calculation of hash values. A hash algorithm may also be used to search for encrypted files on computer systems in the following manner: a hash algorithm is run on a file to generate a number. The hash algorithm is then run on each file in a data set and the numbers are compared to the number generated by the file. If any file produces the same numerical result as the number generated by the file, it is reasonably certain that they are matching files.

Indexed searching may be used to analyze the data. Indexed searching refers to the use of search engine technology to classify the contents of a set of data by creating special references called indexes in a set of data. The indexes make it possible to execute fast lookups of information that may be responsive to legal process or compromised from a security breach.

The concept of a union may also be used in response to a security breach or legal process. In the case of a security breach, a union is the collection of all of the indicators of compromise from each individual attack form. In response to legal process, the union describes all of the forms of data being gathered in response to a single request. The final data set provided in response to the legal process is the union of all minimized data found to be relevant during an acquisition.

The concept of an intersection may also be used for data analysis. Intersection of data occurs when data that is present on more than one storage devices. Intersections commonly occur on networks when the same files are stored on more than one network drive. Intersections of data may be analyzed to determine whether data has been damaged as a result of a security breach. Intersections may also be used in response to legal process to show information about files, such as access to files, creation dates of files, and revision of files. For example, an intersection analysis may reveal all files with the same creation date, the list of files that are common across multiple computer systems, or the list of recipients that are common across a set of e-mail. Analysis of intersections may also prevent the copying and presentation of duplicate files.

Difference analysis may also be used which compares data sets stored on different devices or computer systems. Difference analysis may be used to compare a computer system that has not been compromised with another system to determine whether a compromise has occurred. These differences can be calculated across a wide set of data, including file lists, process listings, system memory state, network connections, and so on. Difference analysis may also be used in generating a response to legal process by eliminating redundancies between computer systems or determining which files on a particular computer system have been changed over time.

A timeline analysis may also be conducted to determine how a computer system has changed over time. This is helpful in finding indicators of a security breach or determining exactly what has changed when a security breach has occurred so that the changes may be corrected. For example, during a computer security incident, looking at file modification dates in line with the dates/times for various system log entries can help create a picture of the activity an attacker may have engaged in while on a system. Timeline analysis is also used in responding to legal process by including or excluding data that was created during a relevant time period. Data may be normalized to compare different classes of information in the same context.

Data normalization and transformation may occur during the analysis phase. Normalization is the process of "lining up" two disparate pieces of information based on their common fields. It may be necessary to change the representation, structure, or content of investigative data in order to perform certain types of analyses. For example, in a situation where data containing time stamps is acquired from a computer system, if the clock on the target computer system was off by some amount, comparing the time data from that system against time data from other systems may be difficult. If the amount of time "skew" on the target computer system is known, it is possible to transform the timestamps on all data acquired from that system to some standard—if the clock was 2 minutes fast, 2 minutes could be subtracted from all time stamp values in order to normalize them for comparison to other systems.

During the analysis, it may be desirable to annotate or markup certain pieces of data. This may make it easier to refer back to findings, collaborate with other investigators, and eventually write reports.

The software that executes the various operations of the present invention may reside on many different hardware configurations which would be known to one skilled in the art. One such configuration involves a multi-tiered approach with software components on separate computer systems as depicted in FIG. 1. In one embodiment, a system and method according to the present invention is divided into three primary components: a data collector (called an agent); middleware for storage, management, and analysis of data (called a controller); and a user interface that allows end-users to perform collection, analysis, and reporting operations in a collaborative environment (called a console).

An agent is a module of software installed on a target system 20 that enables a user to monitor and interact with the target system 20. Agents allow users to gather information about multiple aspects of the target system 20. Agents also permit users to remotely retrieve the contents of the target system's memory or hard drive, and could potentially be configured to modify its contents. The agent may be configured to either communicate over a computer network, or to read and write all relevant configuration information and acquired data to a computer storage medium, such as a hard drive or removable read/write media (USB key, etc). In one embodiment, the agent is built in a modular fashion. The ability to gather a particular piece of data from a target system 20 (e.g. a list of running processes on the target system) is implemented as a discrete module of software and loaded by the agent. This allows for easy adaptation of the agent to different environments that have specific requirements for data collection.

Figure 2:
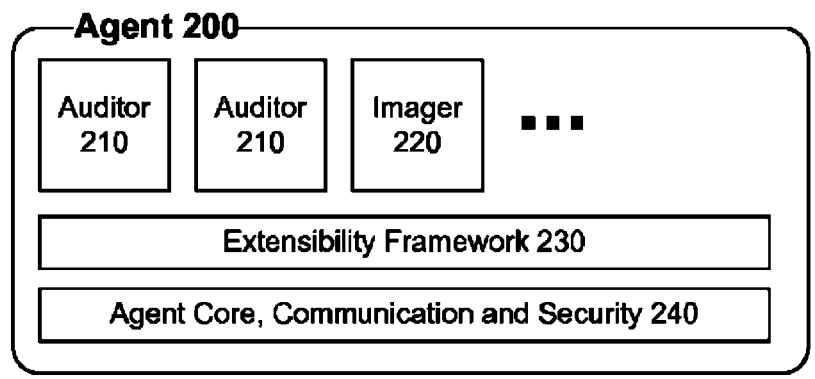
FIG. 2 depicts various components of an agent according to one embodiment of the present invention.

One embodiment of the various software components contained in the agent is depicted in FIG. 2. The agent 200 preferably has at least one auditor 210 and at least one imager 220. A series of application programming interfaces (APIs) built on those services provide an extensibility framework 230, making it cost effective to implement individual modules. Auditor 210 and imager 220 modules can then be built on top of these services. In this embodiment, shared features and services such as communication and security are built into a foundation layer of software 240. Auditors are software modules that obtain different kinds of information from the system, and typically revolve around current execution and data states. Examples of auditor modules include: process listings, system configuration settings, network connection state listings, and file listings. Imagers obtain verbatim copies of data from the system. Examples of imager modules include: disk acquisition, memory acquisition, and file acquisition. Additional module types could also be defined, such as Workers, which could modify the state of a running system by altering either information stored on a hard drive or in memory.

Referring back to FIG. 1, a controller 30 is coupled to target system 20 through a network. The controller 30 comprises software installed on one or more computer systems whose function is to interact with target systems 20 for purposes of gathering information from target systems 20, and the interface software provided for users to interact with the product. Controllers 30 connect and communicate with target systems 20 and interfaces over a computer network. Analysis of acquired data is conducted centrally by the controller, allowing users to work collaboratively on the same set of data. In one embodiment the controller 30 has a modular component for conducting analysis.

Figure 3:
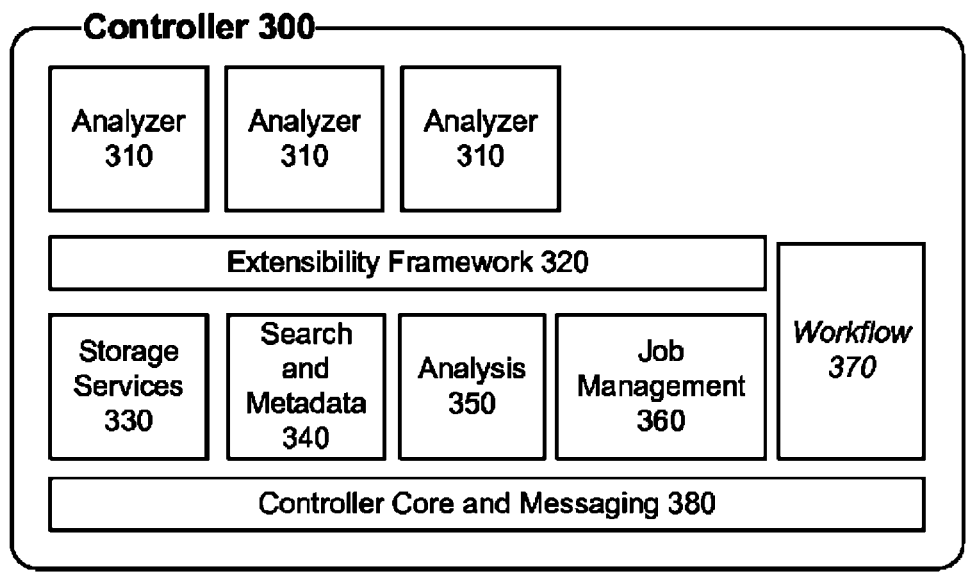
FIG. 3 depicts various components of a controller according to one embodiment of the present invention.

FIG. 3 illustrates the various components that may be present in a controller in one embodiment of the invention. The controller 300 may have a core set of services and capabilities 380 that are implemented as a series of interacting software modules. These services provide capabilities for process intercommunication, interaction with connected interfaces, issuing data collection jobs to target systems and retrieving results, organizing and storing acquired data, and performing analysis. There may be modules for conducting storage services 330, search and metadata services 340, analyses 350, and job management 360 to manage workflow 370. On top of this structure an extensibility layer 320 is implemented that allows analyzers 310 to interact with the computer system. An analyzer 310 is a software module that uses one or more of the various services on the controller to manipulate one or more sets of data acquired from agents at the request of the user. Analyzers are typically some form of data evaluation or transformation module that allows an end user to more effectively minimize data and identify items they are looking for. Analyzers may be created to execute any one of the analysis techniques discussed herein.

Multiple controllers can interact with one another to provide additional processing power, storage space, and geographic proximity based on user requirements. This kind of interconnection of multiple controllers is called a "cluster." For example, if a user wanted to be able to analyze larger amounts of data in less time, additional controllers could be added, which would increase analysis speeds. If a user had a large, diverse network and wanted to position a controller "close" to a set of systems from which the user would be gathering a large amount of data (copying the contents of a hard drive, for example), a controller could be added to a cluster in order to prevent and manage network congestion. When additional controllers are added, the end user is still able to interact with data stored on any controller within the cluster.

Referring back to FIG. 1, the console 40 provides the user with an interface for using the system in a collaborative environment, providing methods to execute jobs that acquire or analyze data, display acquired data, mark up data, and author reports. Any additional features implemented within the software are accessible by the user through this interface. The console 40 is coupled to one or more controllers 30 over a computer network and requests data from it necessary to render the interface for the end user. All requests by the user to acquire new data, analyze data, or modify data (e.g. mark up data, author reports, etc) are sent from the console 40 to the controller 30 for fulfillment.

Although FIG. 1 depicts one embodiment of various elements of the invention coupled together through a network, one skilled in the art would recognize that the components such as the target system and the controllers may be directly connected or even reside on the same hardware. The software necessary to implement the invention may function on a number of different hardware devices, such as personal computers, servers, and portable electronic devices. In one embodiment, the target system, controller, and console may all reside on a single computer which is not connected to any network. In another embodiment, the target system may be a portable computing device and the controller may be a server. In this embodiment, a user may use a personal computer to communicate with the server over the Internet to obtain and analyze data stored on the portable computing device.

The console exposes collaboration features to the user, providing methods for users to work on the same data stored on a controller. In one embodiment, multiple users should be able to view, organize, annotate, add, and modify data on a controller or cluster of controllers at the same time.

The one or more controllers may be configured with information about agents and the target systems they reside on. The controller must have the necessary network address information to contact a target system and it must be able to uniquely identify the agent software running on that target computer. If the controller can not uniquely identify the agent it is communicating with, then it will not be able to correctly organize the data it collects from that agent, making it impossible to identify for an end user where acquired data originally came from.

In order to address these issues, one embodiment of the invention provides two methods for identifying network configuration data for agents: an automatic method called agent discovery and a manual method where the end-user specifies all the necessary configuration data. Agent discovery is a service that is initiated over a computer network by an agent when the agent runs on a target computer. The agent is configured with the location of an agent discovery service when it is first installed on the target system. This configuration is typically the network address or name for the system where the agent discovery service is running. The agent authenticates itself to the agent discovery service and transmits information about itself to the service, including network configuration information. The agent will contact the service periodically to update its configuration information; this ensures the data remains up-to-date, even if it changes.

A controller may periodically contact the agent discovery service to identify any new agents that have become active. When it receives this information, it records the presence of that agent and its identity. Later, when a controller wishes to contact an agent, it asks the agent discovery service for the current network configuration information for that agent. It then uses that information in order to connect to that agent over a network.

Figure 4:
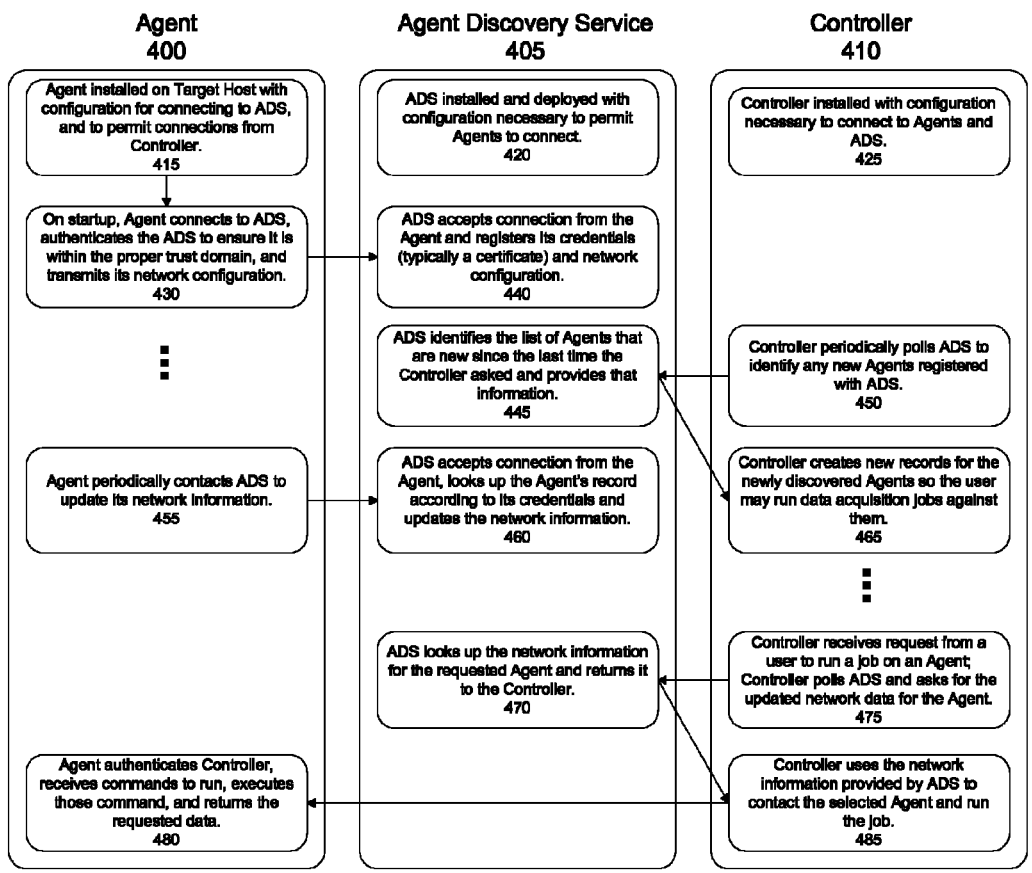
FIGS. 4-7 are flow diagrams which depict interaction between components of the invention.

FIG. 4 is a flow diagram depicting one example of the interactions between an agent, agent discovery service, and a controller according to one embodiment of the invention. An Agent 400 installed on a target host with configuration for connecting to the Agent Discovery Service 405 and to permit connections from Controller 410 in a step 415. The Agent Discovery Service 405 is configured to allow connection with Agents 400 in a step 420. The Controller 410 is configured to allow connection to Agents 400 and Agent Discovery Services 405 in a step 425. Upon startup, Agent 400 connects to Agent Discovery Service 405, authenticates the Agent Discovery Service 405 to ensure it is within the proper trust domain and transmits its network configuration in a step 430. The Agent Discovery Service 405 accepts connection from the Agent 400 and registers its credentials and network configuration in a step 440. The Agent Discovery Service 405 identifies the list of Agents 400 that are new since the last time the Controller 410 asked and provides that information in a step 445. The Controller 410 periodically polls Agent Discovery Service 405 to identify any new Agents 400 registered with Agent Discovery Service 405 in a step 450. The Agent 400 periodically contacts Agent Discovery Service 405 to update its network information in a step 455. Agent Discovery Service 405 accepts connection from the Agent 400, looks up the Agent's record according to its credentials and updates the network information in a step 460. The Controller 410 creates new records for the newly discovered Agents so the user may run data acquisition jobs against them in a step 465. The Controller 410 receives a request from a user to run a job on an Agent 400 and polls Agent Discovery Service 405 to request the updated network data for the Agent 400 in a step 475. The Agent Discovery Service 405 looks up the network information for the requested Agent 400 and returns it to the Controller 410 in a step 470. The Controller 410 uses the network information provided by Agent Discovery Service 405 to contact the selected Agent 400 and execute the job in a step 485. The Agent 400 authenticates the Controller 410, receives and executes commands, and returns the requested data in a step 480.

Optionally, a user may utilize a manual discovery process by connecting to a controller with a console and creating a record for an agent and target computer. This new record may then be configured manually by the user via the console with the appropriate network settings so the controller can contact the invention. Required settings may include the network address, port, and protocol that the controller must use to successfully connect to that agent.

In addition to the methods for specifying network configuration described above, one embodiment of the invention implements a security process that provides for authentication of controllers and agents, and encryption of data transmitted between the components of the invention for added security. Public Key Infrastructure (PKI) technologies may be used to create the necessary components to manage aspects of authentication, authorization, and encryption within the system.

In one embodiment, a trust domain (TD) is maintained by creation of a certificate authority (CA), which is subsequently used to issue credentials to participating entities and to validate that an entity is a member of a given trust domain. Generally speaking, a trust domain defines a set of entities that are authorized to interoperate with one another on some level. The trust domain is defined by the collection of trust domain entities and subscribing entities that are currently participating. Trust domain entities (TDE) include controllers and agent discovery service providers; they are typically entities that perform some service that requires them to be identified and authenticated to other entities. Subscribing entities (SE) are those that need to authenticate an entity within the trust domain, and may include the end user (through the console) and agents. Each TDE is also an SE for certain operations. For example, when a controller is operating in a cluster it needs to authenticate other controllers within that cluster to see if those controllers are authorized to communicate with it. When a controller is authenticating another controller, it is an SE of the trust domain.

An overview of the TDE and SE roles for components of the invention and the end user is as follows. A controller must be authenticated when they connect to other controllers, agents, and agent discovery services in a trust domain entity role. Controllers authenticate to each other when operating in a cluster. Agents must authenticate controllers before accepting commands for acquisitions. An agent discovery service must authenticate a controller before providing information about agents or executing any other requested command. In a subscribing entity role, controllers must be able to authenticate other controllers when operating in a cluster.

In a subscribing entity role, an agent must be able to authenticate controllers and agent discovery services. Controllers are authenticated before an agent will accept commands to acquire data, etc. Agent discovery services are authenticated before the agent will disclose any of its network configuration settings.

In a subscribing entity role, a console authenticates controllers before permitting a user to enter their credentials (such as a username and password).

In a trust domain entity role, an agent discovery service will authenticate itself to agents before agents transmit their network configuration information. In a subscribing entity role, an agent discovery service must authenticate controllers before accepting any commands, such as disclosing the network configuration information for an agent.

In a trust domain entity role, the end user must authenticate himself or herself to a controller before they can be provided access to that controller or controller cluster. In a subscribing entity role, users must authenticate the controller they connect to before they input their credentials to gain access.

In order to create and maintain the trust domain, the following four operations must be implemented and supported in the invention: (1) creation of a certificate authority, (2) signing of certificates for trust domain entities, (3) maintenance of a revocation list for trust domain entities, and (4) authentication and revocation checking mechanisms in a subscribing entities. Each of these steps will be discussed in detail.

In the first step, a certificate authority must be created to anchor the trust domain. The role of the certificate authority is to issue identities and credentials to trust domain entities by signing certificates for those trust domain entities. In one embodiment of the invention, the X.509 standard is used for certificates, which specifies the format, signing algorithms and standards, and methods for validation of a certificate. The certificate authority is a component of one controller within a trust domain. If there are multiple controllers within the same trust domain, one is designated the master and becomes the certificate authority for the entire trust domain. The new certificate authority is called the trust domain certificate authority (TDCA), and is embodied by a public/secret key pair, as well as a certificate representing the certificate authority. The TDCA certificate can be used by any subscribing entity to verify whether a certificate presented by a trust domain entity is valid; therefore, all subscribing entities must receive a copy of the TDCA certificate before they can begin to operate with components that are in the trust domain.

The second step is the signing of certificates for trust domain entities. The primary operation of the TDCA is to sign certificates for TDEs, thereby making them members of the trust domain. This is accomplished according to the appropriate standards associated with use of X509 certificates within a functioning PKI. In short, an entity that wants to become a TDE (for example a new controller) must generate a public/secret key pair along with a certificate signing request (CSR) and submit the CSR to the TDCA. This submission may either be over a network connection or out-of-band (e.g. manually input by a user into the TDCA). The TDCA must validate whether the CSR is valid (in one embodiment of the invention, this is done manually by the user), and then the CSR must be digitally signed by the TDCA, using the secret key corresponding to the TDCA's public key (which is embedded in the TDCA Certificate). Signing the CSR results in creation of a certificate; this is then passed from the TDCA back to the requesting entity either via network connection or out of band. Once the newly created certificate is installed in the requesting entity, it becomes a TDE and may now operate within the Trust Domain.

Figure 5:
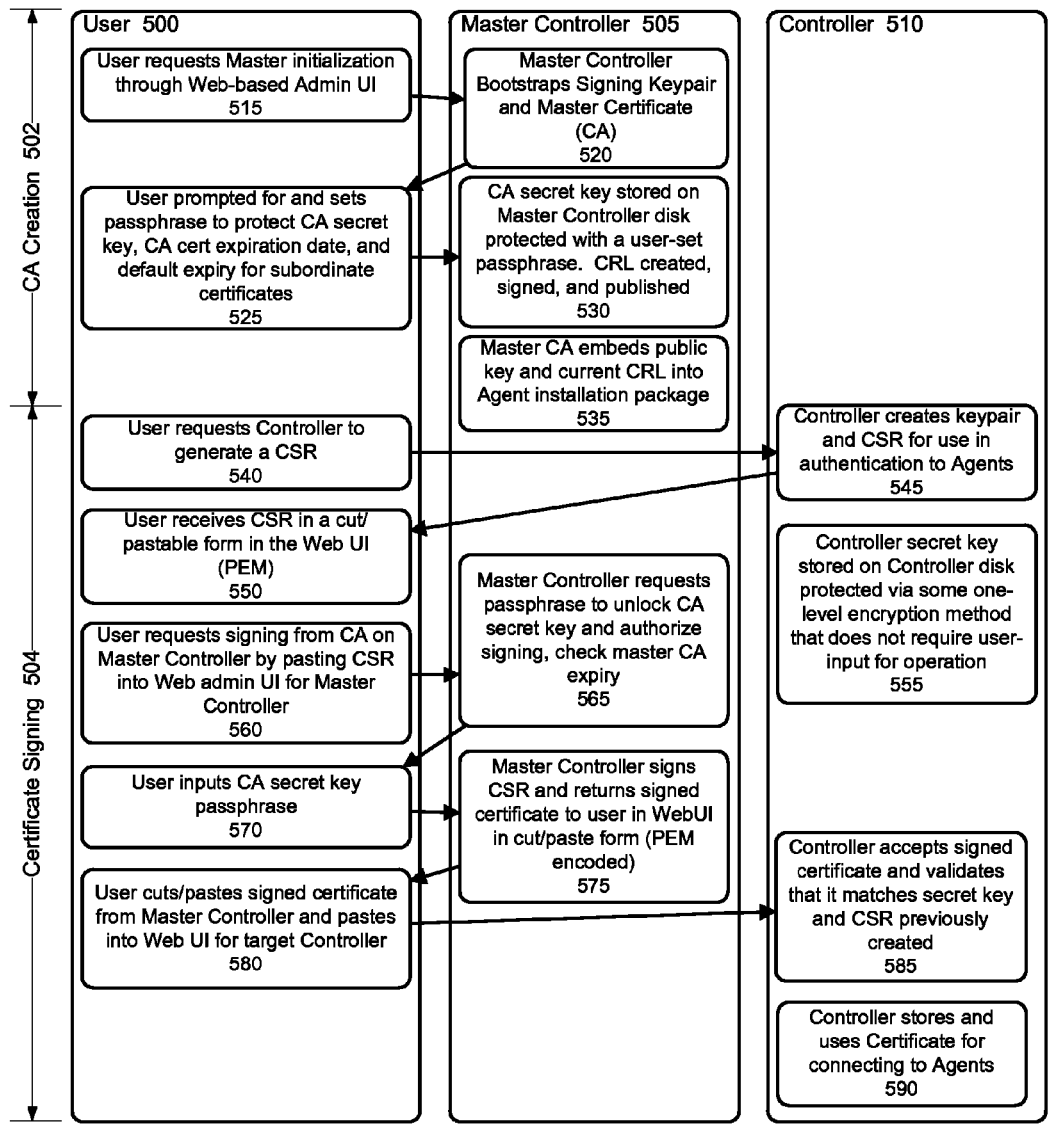

FIG. 5 depicts the creation and deployment of a TDCA. FIG. 5 depicts a method for certificate authority creation 502 and certificate signing 504. A User 500 requests initialization through a web-based user interface in a step 515. The Master Controller 505 bootstraps the signing keypair and master certificate in a step 520. The User 500 is prompted for and sets passphrase to protect the certificate authority secret key, the certificate authority expiration date, and default expiry for subordinate certificates in a step 525. The certificate authority secret key is stored on the master controller disk and protected with a user-set passphrase in a step 530. A certificate revocation list is created, signed, and published in a step 530. The master certificate authority embeds the public key and current certificate revocation list into Agent installation package in a step 535. A User 500 requests that a Controller generate a certificate signing request in a step 540. The Controller 510 creates a keypair and a certificate signing request for use in authentication to Agents 500 in a step 545. The User 500 receives the certificate signing request in a text format from the web-based user interface in a step 550. The Controller secret key is stored on the Controller 510 disk and protected by an encryption method that does not require user input for operation in a step 555. The User 500 requests signing from the certificate authority on Master Controller 505 by supplying the certificate signing request into the user interface for the Master Controller 505 in a step 560. The Master Controller 505 requests a passphrase to unlock a certificate authority secret key and authorize signing check master certificate authority expiry in a step 565. The User 500 inputs the certificate authority secret key passphrase in a step 570. The Master Controller 505 signs a certificate signing request and returns the signed certificate to a user in the web-based user interface in a step 575. The User 500 receives the signed certificate from the Master Controller 505 and supplies it to the target Controller 510 through the web-based user interface in a step 580. The Controller 510 accepts the signed certificate and validates that it matches secret key and certificate signing request previously created in a step 585. The Controller 510 stores and uses the certificate for connecting to Agents 500 in a step 590.

The third step is the maintenance of a revocation list for trust domain entities. The TDCA can issue certificates to entities to make them part of the trust domain. However, it must also be able to revoke those certificates, allowing subscribing entities to identify when a given TDE should no longer be trusted. For example, if a user had two controllers within their trust domain and subsequently decided to remove one (e.g., sending it away for maintenance or decommissioning it because the extra capacity was no longer required), a method must be in place to ensure that controller's certificate is no longer trusted by the trust domain. In one embodiment of the invention, this is accomplished by publication of a certificate revocation list (CRL). The CRL is created and signed by the TDCA when a user wants to remove an entity from the trust domain. The CRL contains a list of all certificates previously issued by the TDCA that are no longer valid. Subscribing entities can obtain a copy of this list and use it in conjunction with the TDCA certificate to validate whether a TDE has a valid, non-revoked certificate when it communicates with an SE.

Figure 6:
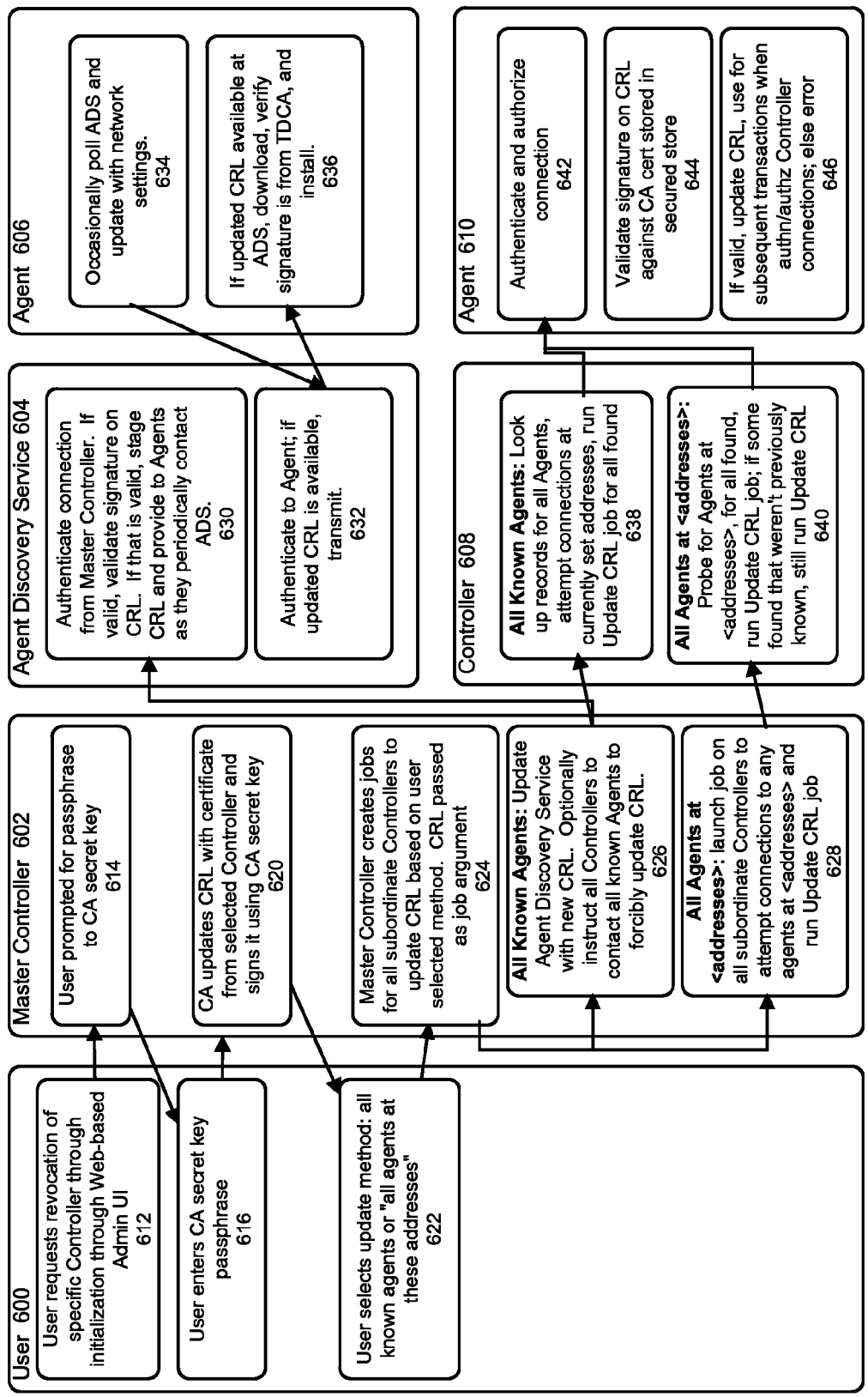

FIG. 6 depicts one embodiment of a method of certificate revocation list management according to the present invention. A User 600 requests revocation of a specific controller through the web-based user interface in a step 612. The user is prompted by the Master Controller 602 for a passphrase to a certificate authority secret key in a step 614. The user enters the certificate authority secret key passphrase in a step 616 and the certificate authority updates the certificate revocation list with the certificate from the selected controller and signs it using a certificate authority secret key in a step 620. The User 600 then selects an update method in a step 622 and the Master Controller 602 creates jobs for all subordinate controllers to update the certificate revocation list based on the method selected by the user in a step 624. The agent discovery service is updated with new certificate revocation list and agents contacting the agent discovery service download and authenticate the certificate revocation list in a step 626. The controller may also contact an agent and instruct it to install the new certificate revocation list. All controllers launch a job on all agents to attempt connections to any agents and update the certificate revocation list on all agents in a step 628. The Agent Discovery Service 604 authenticates a connection with the Master Controller 602, validates the signatures on the certificate revocation list and provides it to agents as they periodically contact the Agent Discovery Service 604 in a step 630. The Agent Discovery Service 604 authenticates to agents such as Agent 606 if an updated certificate revocation list is available and provides the list to the Agent 606 in a step 632. The Agent 606 occasionally polls the Agent Discovery Service 604 and updates the Agent Discovery Service 604 with network settings in a step 634. If an updated certificate revocation list is available at the Agent Discovery Service 604, the Agent 606 will download the certificate revocation list, verify the signature on the list, and install the list in a step 636.

The Controller 608 looks up records for all agents and attempts connections to the agents for the purposes of updating the certificate revocation list on the agents in a step 638. The Controller probes all agents for the purposes of updating the certificate revocation list and updated the certificate revocation list on agents that were not previously known in a step 640. The Agent 610 authenticates and authorizes the connection with the Controller 608 in a step 642. The Agent validates the signature on the certificate revocation list against the certificate stored in a secure storage in a step 644. If the certificate is valid, the certificate revocation list is updated in a step 646 and used for subsequent transactions.

Figure 7:
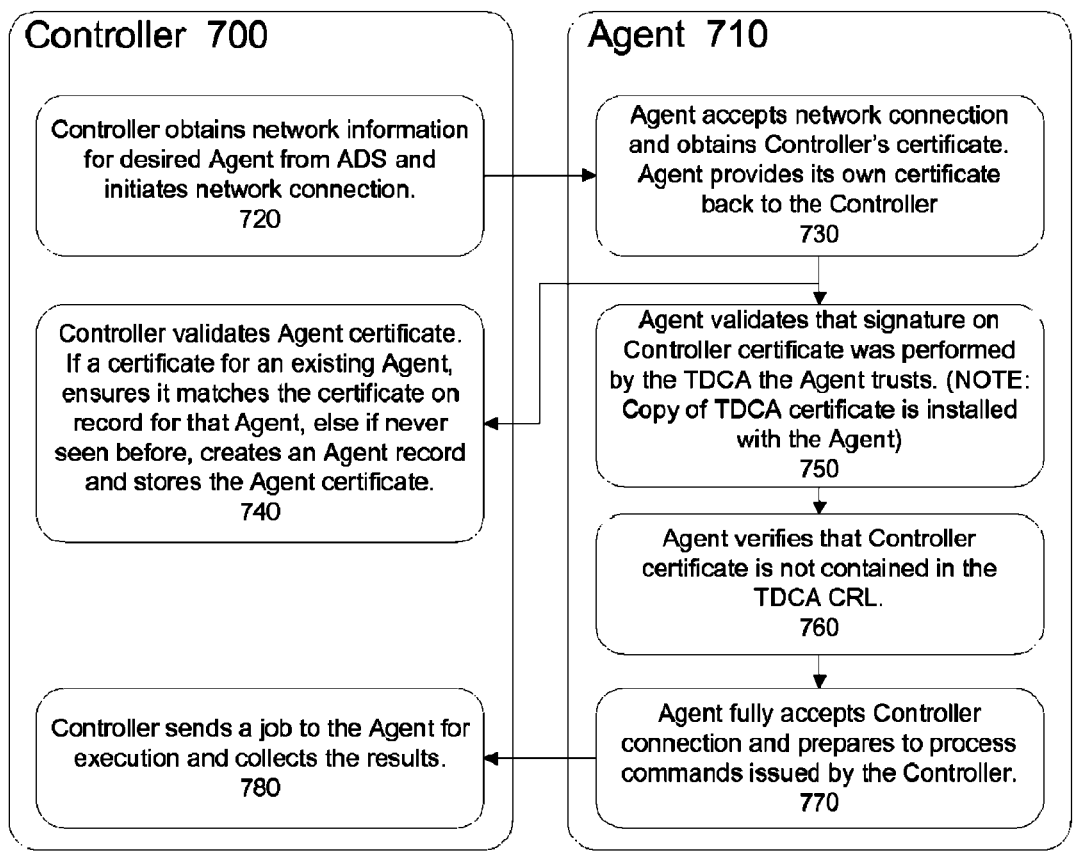

FIG. 7 is a flow diagram depicting the steps involved in the use of a CRL. A Controller 700 obtains network information for a desired Agent 710 from an agent discovery service and initiates a network connection in a step 720. The Agent 710 accepts the network connection and obtains the Controller's certificate in a step 730. The Agent 710 provides its own certificate back to the Controller 700. The Controller 700 validates the Agent certificate and if the certificate is for an existing Agent 710, the Controller ensures that it matches the certificate on record for that Agent in a step 740. If the agent has never been seen before, the Controller creates an Agent record and stores the Agent certificate. The Agent 710 validates that the signature on the Controller certificate was performed by the trust domain certificate authority the Agent trusts in a step 750. The Agent 710 verifies that the Controller certificate is not contained in the trust domain certificate authority certificate revocation list in a step 760. The Agent fully accepts the Controller 700 connection and prepares to process commands issued by the Controller 700 in a step 770. The Controller 700 sends a job to the Agent for execution and collects the results in a step 780.

The fourth step if the implementation of authentication and revocation checking mechanisms in all subscribing entities. Subscribing entities (SE) must be able to authenticate members of a trust domain in order to interact with it. For example, agents need to be able to authenticate a controller before accepting commands from it to acquire data; users need to be able to authenticate a controller before typing their username and password into the console to gain access. A subscribing entity authenticates a TDE by validating that the TDE's certificate was issued by the TDCA. To do this the subscribing entity must have a copy of the TDCA certificate. In one embodiment of the invention, the TDCA certificate is part of the installation package for the agent and console software. When a TDE connects to an subscribing entity (or vice versa), the TDE provides a copy of its certificate to the subscribing entity and performs a challenge operation to validate that it also has the secret key that corresponds to the public key embedded in that certificate (in one implementation this is done using the Secure Sockets Layer protocol). The subscribing entity then validates the TDE certificate by verifying the digital signature embedded inside of it. It uses its copy of the TDCA certificate to perform this operation. It then checks the TDE's certificate against the CRL. If the TDE certificate is not on the CRL, the connection is then authenticated and the subscribing entity can continue its communication with the TDE. FIG. 7 is a flow diagram reference implementation of authentication with revocation checking between a TDE (controller) and a subscribing entity (agent).

In addition to the maintenance of the trust domain, there must also be a method to uniquely identify certain subscribing entities that do not function as a trust domain entity—that is to say, there needs to be a mechanism to have a unique, authenticated identifier for an entity where that identifier was not issued by the TDCA. In particular, there must be a method for agents to create or obtain a unique identity so they can participate in operations within a given trust domain. This is required in order to ensure that the results of any data acquisition can be bound to a single, unique agent so a user knows a given set of acquired data came from a given agent—identifying the source of information in either an IR or EED event is critical.

One embodiment of the invention uses the following process to provide a method for agents to create a unique credential and subsequently utilize that credential within a trust domain.

Upon installation, the agent must have the TDCA certificate installed with the agent software to ensure the agent can authenticate TDEs. The agent is also configured with the network information necessary to contact the Agent Discovery Service for the Trust Domain.

At first startup, the agent creates a self-signed certificate; that is, a secret/public key pair with a corresponding certificate that encompasses the public key, whereby the certificate was digitally signed by its own private key. This particular embodiment uses the X509 certificate standard for specifying format and signing algorithms. The public/secret key pair may be, for example, an RSA key 2048 bits or greater in length, generated through use of software adhering to Public Key Cryptography Standard #1. However, any algorithm and key length which adhere to public key infrastructure standards may be used. Software is used for generating random data during the key generation process (an important aspect of ensuring a key is reasonably secure and unique).

Two possible methods are now used to "enroll" the agent. Enrollment is the process of registering an agent's existence with the controller and recording its certificate. An agent may be enrolled either via the Agent Discovery Service or through a direct connection from a controller to the agent using one of the following steps.

An agent may enroll with a controller using a direct connection. When a controller connects to an agent, it transmits its own certificate and receives a copy of the agent's self signed certificate. These certificates are used to establish an SSL connection, which is then used for all subsequent communication between controller and agent for that session.

The controller looks up the agent certificate to see if an agent record exists for it. If it does not, it creates a record for the agent and stores a copy of the agent's certificate inside of it. Any data retrieved from the agent (e.g. a process listing, files from the hard drive, etc) is associated with the newly created agent record. This process is referred to as enrollment.

If the controller has seen the agent certificate before, it identifies the agent record for that certificate—in other words, the agent has already enrolled. Any data retrieved from the agent is associated with this pre-existing agent record. See FIG. 7 for an illustration of this process.

Alternatively, an agent may enroll using an agent discovery service. If the agent is configured to contact an agent discovery service, the agent initiates a connection and authenticates the agent discovery service according to its certificate by using its local copy of the TDCA certificate and TDCA CRL. See FIG. 7 for an example of how authentication of TDEs, such as the ADS, functions. The ADS records the agent's certificate and network configuration settings which are transmitted by the invention to the ADS. See FIG. 4 for more information. When ADS is polled by a controller for a list of new agents, the record for the agent, along with its certificate, is provided to the controller.

The controller looks up the agent certificate to see if an agent record exists for it. If it does not, it creates a record for the agent and stores a copy of the agent's certificate inside of it. Any data retrieved from the agent (e.g. a process listing, files from the hard drive, etc) is associated with the newly created agent record. This process is referred to as enrollment.

If the controller has seen the agent certificate before, it identifies the agent record for that certificate—in other words, the agent has already enrolled. Any data retrieved from the agent is associated with this pre-existing agent record. See FIG. 4 for an illustration.

Once all three classes components of the system are deployed (console, agent, and controller), the security infrastructure established, and agents are registered and reachable by the controller (if operating in networked mode), collection and analysis functionality can be used.

In one embodiment of the invention, users interact with the console to identify a series of collection and analysis commands to be executed. Such a series of commands is referred to in the context of the invention as a script. The user also specifies a set of inputs for the script and a time or times for the script to be executed. A script, when combined with a set of inputs to operate on (e.g. a list of agents to run the script on, a set of data to analyze, etc) and a time or times to execute (e.g. "now", "Aug. 29, 2007 at 11:59AM ED"), is called a job. In one embodiment, commands are in a pipeline; that is, a sequential execution of one command to the next. A critical failure of any step within the series causes the entire job to quit. Other implementations could include the ability to operate in a grid or tree structure, where the operation of commands could depend on the state and results of a previous command. Failure of any step would not necessarily mean that the job would halt if subsequent processing directives were provided to indicate execution could continue. Such an approach would require the structure for a script to be very similar to a computer programming language.

As inferred above, multiple commands may be "chained" together; a command to collect a certain series of data could be followed by a command to analyze that data. The outputs of one command must match the required inputs for another command in order for them to be chained.

The controller is responsible for executing the job. It reviews the commands to be executed along with the inputs for each of those commands. Commands are either directives to marshal to a set of agents or a series of analyzers via the analysis service (see FIG. 3). The controller may also implement parallel execution of commands within the job's script if the individual commands are found to be fully independent of one another (note this is true whether the script is of pipeline form, or grid/tree). In embodiments with more than one controller (e.g., configured as a cluster as described herein) commands may also be sent out to different controllers for execution.

When a command is executed, it returns a set of data that may contain the intended set of results (e.g., a set of data from an agent, the results of an analysis), one or more error documents that identify why a command failed to execute, or both if a command was partially successful. These results are referred to as an audit or audit result. The controller stores this information and performs various operations on it to make it available for use by the end user, including indexing (making the data available through a search engine). The data can then be accessed by the user for viewing, used as input for an analysis, marked up by the user during the review process, and referenced in the creation of reports or other documents within the invention.

Figure 8:
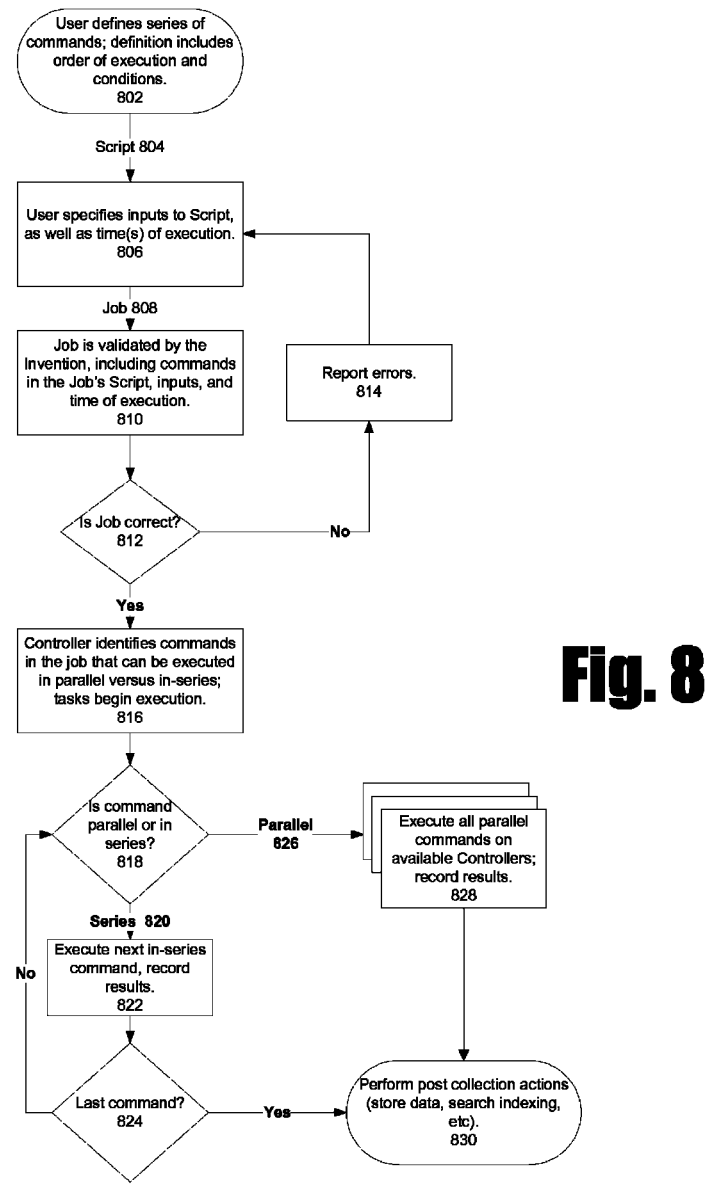
FIGS. 8-9 is a flow diagram showing a method according to one embodiment of the present invention.

FIG. 8 provides a flowchart outlining a job execution process according to the present invention. The user defines a series of commands including order of execution and conditions in a step 802 to create a script 804. The user specifies inputs to the script as well as time of execution of the script in a step 806 creating a job 808. The job is validated by the invention including commands in the job's script, inputs, and time of execution in a step 810. The job is examined to determine whether the job is correct in a step 812. If the job is not correct, errors are reported to the user in a step 814 and the user is allowed to redefine the script. If the job is correct, the controller identifies commands in the job that can be executed in parallel or in series and begins execution of the tasks in a step 816. The commands are examined to determine whether they are in parallel or in series in a step 818. If the next command is series 820, the next in-series command is executed and the results are recorded in a step 822. The executed command is examined to determine whether it is the last command in a step 824. If it is not the last command, the next command is examined to determine whether it is in parallel or in series in step 818. If the last command has been executed, the system performs post collection actions such as storing data and indexing data in a step 830. If the examined command to be executed is in parallel 826, the system executes all parallel commands on available controllers and records results in a step 828.

Commands for collection of data are sets of instructions to be dispatched to one or more agents. The instructions have a series of parameters defined that identify the data the agent is to collect. If worker modules were also implemented, these commands would include instructions on how to modify the computer system the agent was running on. Parameters identify characteristics of data on the target system that should be collected. This allows a user to specify only what they want to retrieve, reducing the amount of information transported back to the controller from the agent. This "precision strike" collection method assists in offsetting the challenges posed by ever-increasing storage media sizes on computer systems. Extensive specification of parameters is only implemented for those classes of data that are large or cumbersome to manage; for smaller, easier to collect data simply "getting everything" and allowing the user to filter it after acquisition is more efficient.

Several classes of filtering are defined to assist users in narrowing the scope of their audit depending on the type of data they are collecting. In general, there are two primary methods for filtering: filtering based on the metadata for an item, and filtering on content contained in the item itself. In one embodiment, all of the data specified comes from systems using the Microsoft Windows operating system. The data being referenced is representative of most common computer systems; other data could be added depending on the goal of the investigator, the focus of a specific invention implementation, or the specific computer system or device the data is being gathered from.

The type of data acquired will vary by embodiment and need of the user. Various parameters may be used for filtering, which may be based on metadata or content. File listings and file contents for both regular and deleted files may be filtered using metadata by file name, path name, creation date, modification date, access date, file size, file type, or other information depending on available metadata. The file listings and file contents may also be filtered by content or file hash. The entire contents of a computer system hard drive or other storage devices may be filtered by disk size, disk volume, or logical drive letter for each device. Portions of or the entire contents of memory on a computer system may be filtered by memory location using the metadata of the memory. It may also be filtered by contents or owning process using the content of the data.

Metadata or content items may be compared to user-supplied arguments. Those arguments typically take the form of a value to compare against and an operator (e.g., =, >, <, >=). In one embodiment, comparisons may also support the use of regular expressions by users to specify a pattern for matching against metadata or content. Regular expressions are strings of characters or byte sequences that are used to describe or match a set of strings or byte sequences according to certain syntax rules.

Figure 9:
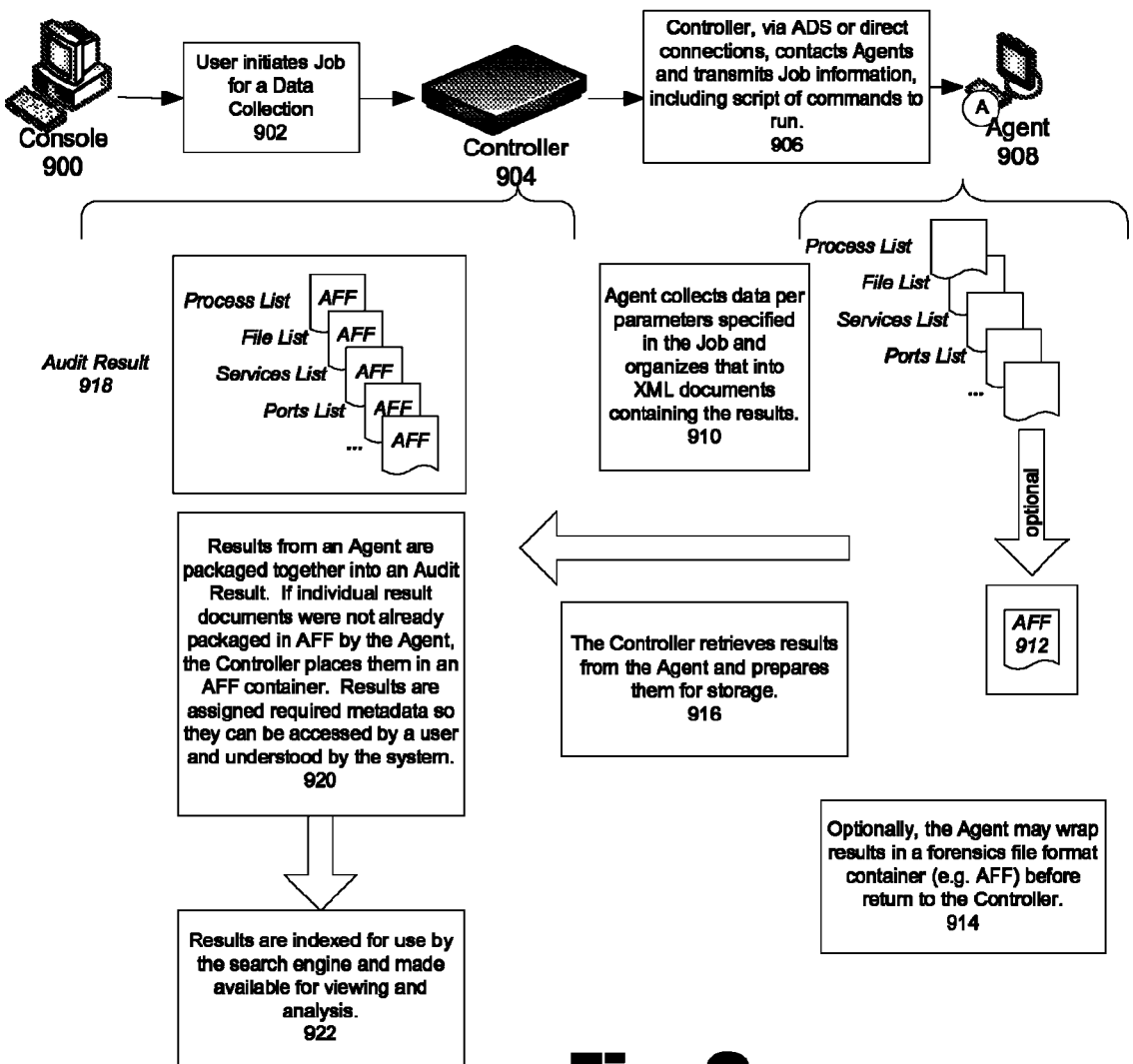

Once data is collected by the agent, it is retrieved by the controller, potentially stored in a forensics file format if one is not already present, stored and referenced in the system, indexed for search, and made available for access by end users. The following sections detail this process. An overview of the data collection process is presented in FIG. 9. A user initiates a job for data collection from the console 900 to the controller 904 in a step 902. The controller 904, using an agent discovery service or direct connections, contact agents and transmits job information, including script of commands to run in a step 906. The agent 908 collects data per parameters specified in the job and organizes the data into XML documents containing the results in a step 910. Optionally, the agent may wrap results in a forensics file format 912 container before return to the controller 904 in a step 914. The controller 904 retrieves results from the agent and prepares them for storage in a step 916. Results from the agent are packaged together into an audit result 918 in a step 920. If individual result documents were not already packaged in a forensics file format container, the controller 904 places them in such a container. Results are assigned required metadata so they can be accessed by a user and understood by the system. Results are then indexed for use by the search engine and made available for viewing and analysis in a step 922.

For both security evaluation and electronic discovery events, an investigator may require assurances that acquired data has not changed since the time it was collected. The most common method of providing this for evidence (both digital and physical) is through use of tamper-evident processes. A tamper-evident process may not directly prevent modification of evidence or data, but it makes highly improbable that the modification can take place without that modification being detectable.

Through use of various cryptographic techniques, it is possible to package digital information into formats that are tamper-evident. Once packaged, if data within the package is modified, the modification is detectable. In one embodiment, an open format is used for providing a subset of this capability. The Advanced Forensics Format (AFF) provides methods for storing data in a container that, in turn, contains information about those contents sufficient to detect if they were accidentally modified. The AFF container contains secure hash checksums of the information contained inside of it. By examining those checksums and comparing them to the data inside of the AFF container, it is possible to detect if information was accidentally modified.

The scenarios outlined herein assume a configuration of the system where the controller is connecting to the agent over some form of network. However, many of the analysis, markup, and reporting capabilities of the system are still usable if data is imported directly into the controller. In one embodiment, the system includes a mode of operation for the invention where it can operate out-of-band (OOB): the agent executes locally on a computer system and saves the acquired data to some form of removable media (e.g. a USB memory storage key, externally connected hard drive, floppy disk). The removable media is then taken either to a workstation where the console is installed or directly to the controller itself and then imported into the system. This provides several advantages. Firstly, operating OOB is sometimes more efficient for large collections if networks are slow or congested. In a scenario where a user is trying to collect significant amounts of data (the entire contents of a hard drive, perhaps a large set of files), using an OOB method to directly interface with the target system to acquire data may result in a faster collection. Secondly, some target systems are on compartmentalized networks or not networked. In these scenarios an OOB method for collection provides a work-around for performing a collection when a controller cannot connect directly to the agent over a network. Thirdly, an OOB use of the agent may have a reduced footprint on the target system. In some circumstances a user may wish to minimize the impact on a target system. For example, if the user were conducting an investigation against a fellow employee and wanted to collect data from their computer system, the user might want to avoid persistently installing the agent to minimize the risk of detection. By using the agent in an OOB configuration, the user could place it on removable media (e.g., a USB key), go to the target system, run the agent, and save the data to the same removable media.

Data must be normalized and stored in an efficient manner in order for the invention to utilize it for analysis, search, and collaborative review. Much of the data described herein can be represented in rows with each row containing several fields, the combination of which describes a data item. Each class of such data must be described in the form of a schema—a formal description of the data using a common syntax—in order to provide the necessary structure for performing relational comparisons between data sets. For example, in one embodiment of the invention a process listing contains multiple rows of process information, with each row containing a process name, process identifier (a number assigned by the computer operating system the process is running on), the full path and filename to the executable file associated with the process, arguments (e.g. options supplied at run-time), start date/time, and the length of time the process has been running. A file listing contains, among other things, the full path and name of the file, the created, last modified and last accessed time, and file size (in bytes). The date/time fields and path/filename fields must adhere to the same syntax in order for relational operations to be possible across them (e.g. "show the creation date for all of the files associated with currently running processes").

Figure 10:
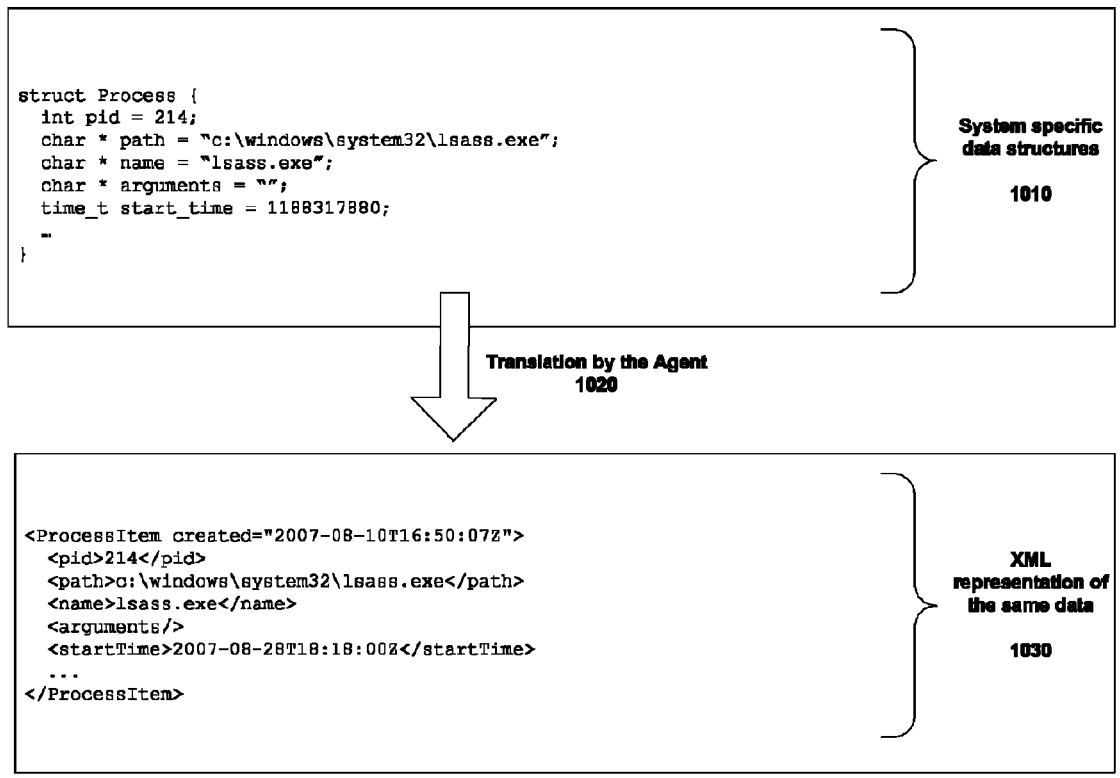
FIG. 10 depicts the translation of data into a uniform representation according to one embodiment of the invention.

In one embodiment of the invention, the requirement for formal schema and storage syntax is met by using Extensible Markup Language (XML). XML is a general purpose markup language (a standard syntax for text and information about that text) that facilitates the exchange of structured information. The various XML standards provide both a method for describing the structure of data in a schema and a syntax for storing the data itself. The invention defines a set of schemata for the various types of data collected from a target system through the agent. All components of the invention adhere to those schemata when operating on that data: the agent formats the acquired data into the proper schema, the controller ensures it does not modify that data once it is acquired, and the console understands how to parse and display the data adhering to the various schemata. FIG. 10 illustrates how one component of the system changes representation of data from non-XML into XML formats. System specific data structures 1010 are translated by the Agent in a step 1020 to create an XML representation of the same data 1030. One skilled in the art would recognize that a plurality of different languages may be used to normalize data in the system.

In addition to formally describing the structure of individual data items, the system preferably defines higher order structures in which to organize individual data items and groups of data items in order to make the overall data model comprehensible to the end user. The following is a list of data objects, the contents of each data object, and the function of the data object.

Row Item. The row item contains collected data that is row/field oriented. Direct storage obtained from a target system can be represented as a row-oriented, field-based entry. Examples include process list items and file list items.

Content. Content contains multiple row items that share a common schema, or contains verbatim information from a target system that should not be translated into a document of row items according to a schema. Row item content examples include: complete process listing and complete file listing. Verbatim examples include entire files from the file system of the target system, hard drive contents from the target system, and system memory contents from the target system Entity. Entity data objects are generic objects that contain metadata and content. Entities are a generic form of object within the system. Entities directly store metadata and content, or have reference directly to content. Entities may also contain collections, described below.

Collection. A collection is a generic object that contains a list of other objects. Collections are used to represent a list of other objects, which are typically entities.

Document. A document contains content and metadata about the content. Documents wrap contents and include additional attributes and information about those contents that are necessary for the system to function.

Result. A result stores the results of an audit from an agent or an analysis in the form of a collection of documents. A result provides a set of metadata about the audit or analysis including information about the script used to run the audit or analysis.

Result set. A result set contains a collection of results for a given job and associated metadata. Result sets contain metadata about the job itself (such as the script used for the job) along with a collection of results.

Markup. A markup contains information about attributes as applied to individual row items within a document. Markups are used to store the information necessary for row item attribution, which is the method provided by one embodiment of the present invention for allowing users to mark or annotate individual row items within a record-oriented document. This permits use cases such as setting visible flags or tags on data items, or enabling workflow at a level more granular than a complete document.

Attribute. An attribute contains a name, content, and list of objects. Attributes provide a mechanism for users to "mark" data within the system. The attribute object stores the information necessary to identify the attribute and all of the objects it is applied to within the system. Some implementations of the invention may include row items within this context, or may use special characteristics of the markup object discussed above to address row-level attribution.

Search Result. A search result contains a search query and evaluation of the query returns a list of the entities responsive to the query. Search results store search queries specified by the user or other components of the system. The function of the search result is to create a dynamic grouping of documents that contain the terms indicated in the query. Each time the query is evaluated (i.e., each time the search result is viewed) a document is returned containing references to entities within the system that contained the search terms specified in the query.

Library. Libraries organize all entities of a given type into a list. For example, the list of all audit and analysis results is in the audit result library and a list of all documents is in the document library.

Workspace. A workspace is a set of libraries containing all objects within an access domain in the system. Workspaces are the "top level" entities in the system. They contain a series of libraries that in turn contain all the data for a given access domain. In this context, an access domain is a set of data that share access control rules.

Each object type is represented as an XML document, ensuring consistent syntax across the system for data representation. When an object is stored, a way to refer to and access that data is also provided so that subsystems within the system and end users can read the data and interact with it. In one embodiment of the invention, interaction is facilitated through use of Representational State Transfer (REST). REST is a style of software architecture that outlines how resources are defined and addressed. Expressed simply, REST has requirements for proper functionality on a system.

The system is preferably composed of client components and server components, where the client is concerned primarily with user interface, and the server manages data storage and access. The system provides this through the components of the console (client) and controller (server). Additionally, the controller acts as a client when interacting with the agent, which in turn acts as a server during those transactions.

The system is preferably also stateless, in that every request from client to server preferably contains all the information necessary to process that request and not rely on subsequent or previous transactions. Any state maintained within the system is maintained by the client. The invention is stateless in all transactions between console, controller, and agent—each request is independent and contains all the information necessary to execute it, whether between console and controller or controller and agent.

The system preferably functions with a cache. Responses from server to client are preferably explicitly marked as cacheable or non-cacheable. Cacheable means that a response from the server can be later re-used by the client for future equivalent requests. The system provides for this between console and controller.

The interface between all components of the system is preferably the same or similar. REST is defined by four interface constraints: identification of resources, manipulation of resources through representations, self-descriptive messages, and hypermedia as the engine of application state. Resources are "any information that can be named" and therefore accurately describes all of the data objects described above. Within REST, and within one embodiment of the invention, the identifiers for resources are Uniform Resource Identifiers (URI) as specified by Internet Engineering Task Force (IETF) Request for Comments (RFC) 3986. A representation is "a sequence of bytes, plus representation metadata to describe those bytes." In essence an entity as defined above is a representation in this context. More specifically, XML documents are the model for all data within one embodiment of the invention. A piece of data may be changed by taking a copy of that data, changing it to the desired state, and then sending that copy to the component within the invention responsible for processing that data. Messages are self-descriptive. This captures the concept of statelessness and "cacheability" as described above; all messages sent from client to server contain everything inside of them that is necessary to understand them, while messages from server to client are explicit in stating their cacheable status. Hypermedia as the Engine of Application State: Given that all resources are manipulated by transferring representations of those resources between components of the system, and the system fully operates on self-descriptive messages, it is clear that the combination of these two concepts make up the engine by which an application may derive state. In a REST-compliant interface, the responsibility for state maintenance is fully on the client, ensuring server components do not need to comprehend it, and messages between components do not have special methods for transacting it.

A system according to the present invention provides for each of these by assigning URIs to every data object within the system, representing those objects as XML documents, and utilizing the Hypertext Transfer Protocol (HTTP) over SSL for network transactions between the console, controller, and agent.

A system according to the present invention is preferably a layered system, meaning it is composed of hierarchical layers where each layer may not "see" beyond another layer with which it is interfacing. This tends to reduce complexity of the design. A particular system may have any number of layers depending on the complexity of the system.

A system according to the present invention extends client functionality by allowing clients to download and execute code from the server, typically in the form of scripts. It is typically optional in a REST system. In one embodiment of the invention, this is used when providing enhanced capabilities for user-generated reporting.

Each data object within the invention is represented by an XML document. Containers are represented by a special form of XML document—a syndication feed. Syndication feeds provide a summary of available content, typically in the context of a web site. Using this structure to represent containers as described above provides a consistency with the requirements for REST as stated above. There are a number of standards for formatting and providing syndication feeds within a software architecture. One embodiment of the invention uses an Atom syndication feed, which fully adheres to REST software methods.

Figure 12:
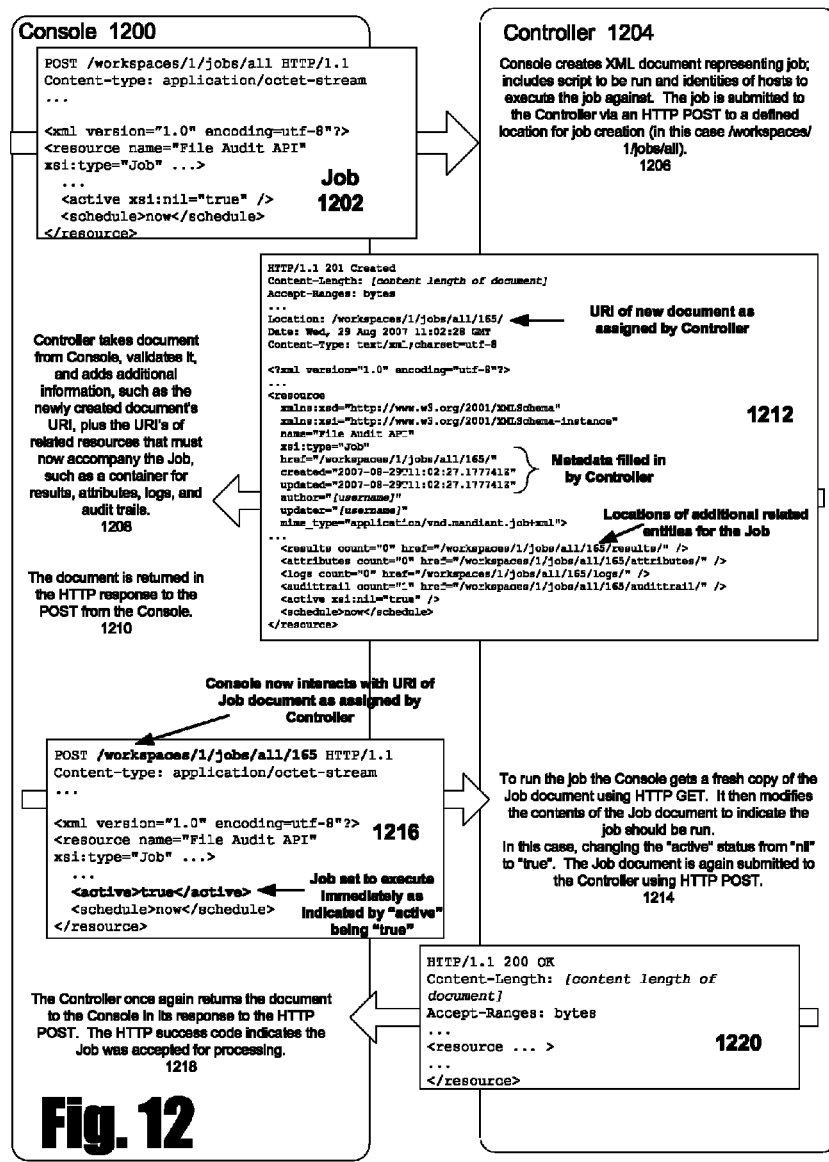
Figure 13:
Figure 14:
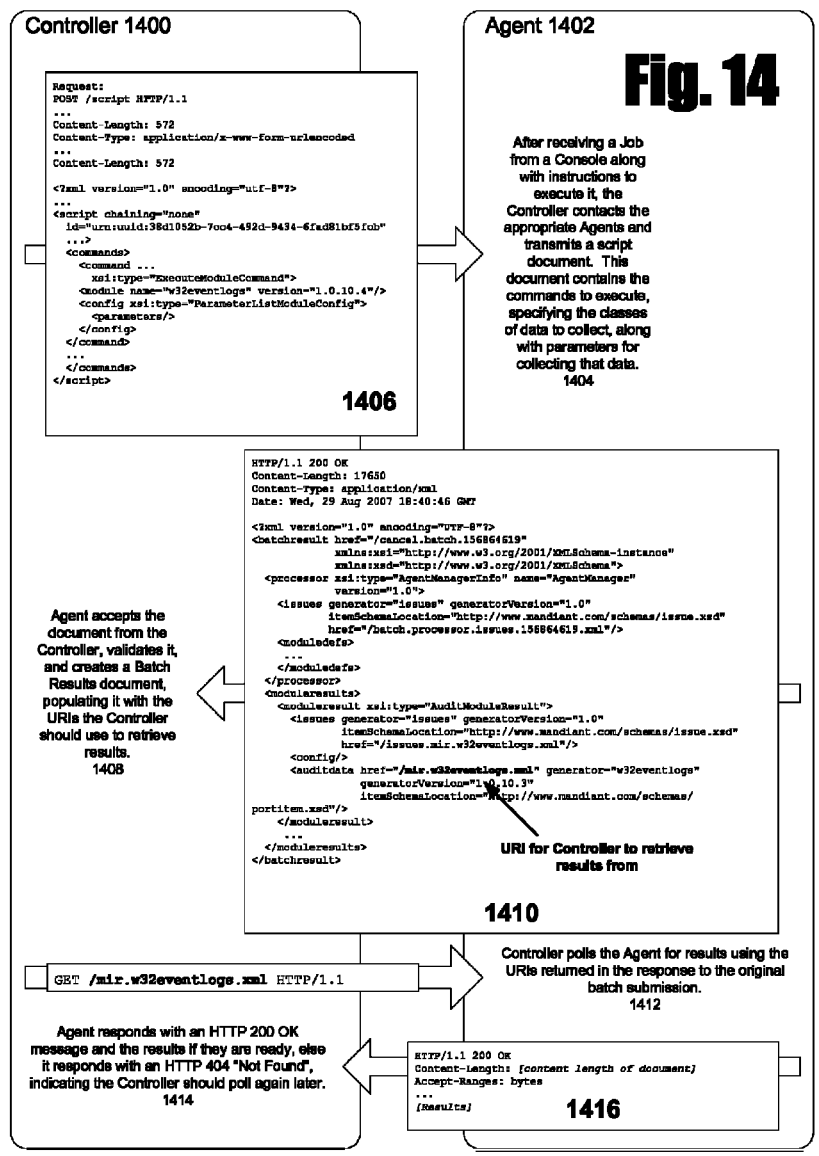

FIGS. 11-14 illustrate REST in the context of initiating a job from the console to collect various data from an agent. FIG. 11 illustrates a job with accompanying script in XML. FIG. 12 demonstrates how one embodiment of the invention works using REST in a sample transaction. FIG. 13 illustrates how status updates regarding ongoing operations on the controller can be retrieved by a console using Atom syndication feeds in a REST compliant fashion. FIG. 14 illustrates the REST model in an exchange between controller and agent.

The process depicted in FIG. 12 begins when a console 1200 creates an XML document representing a job as depicted in 1202. The console includes the script to be run and the identities of hosts to execute the job against. The job is submitted to a defined location for job creation on the controller 1204 in a step 1206. The controller 1204 takes the document from the console 1200, validates it, and adds additional information such as the newly created document's uniform resource locator plus the uniform resource locators of related resources that must now accompany the job such as a container for results, attributes, logs, and audit trails in a step 1208. The document is also returned to the controller 1204 in a step 1210. The job document with information added by the controller 1204 is depicted in box 1212. To run the job, the console 1200 obtains a fresh copy of the job document and modifies the contents of the job document indicate that it should be run in a step 1214 as depicted in the updated job document 1216. The job document is then submitted back to the controller. The controller 1204 returns the document to the console 1200 with a success code indicating that the job was accepted for processing in a step 1218. An excerpt of the job document is depicted in box 1220.

The process depicted in FIG. 13 begins when a console occasionally polls a controller 1302 to access the feed of all available updates in a step 1304. An example of an http get command to obtain such an update is depicted in 1306. The controller 1302 then returns a document containing the requested set of update information in a step 1308. The console 1300 may use this information to update the user interface or perform other state management operations. An example of a document containing update information is depicted in 1310.

The process depicted in FIG. 14 begins with a controller 1400 contacting an agent 1402 and transmitting a script document after receiving a job from a console along with execution instructions in a step 1404. One example of a script document is depicted in 1406. The agent 1402 then accepts the document from the controller 1400, validates it, and creates a results document with the uniform resource locators the controller 1400 should use to retrieve results in a step 1408. One example of a uniform resource locator the controller 1400 should use to retrieve results is depicted in 1410. The controller 1400 uses this uniform resource locator to poll the agent 1402 in a step 1412. The agent 1402 responds with a message and the results if they are ready or an error message suggesting that the controller 1400 request results again later in a step 1414. An example of a response message is depicted in 1416.

Data stored within the system fits into two broad categories: metadata and content. Metadata is "data about data." Metadata includes information about a data object that is required to describe it to the rest of the system or an end user. Typical metadata fields within the invention include, but are not limited to: identity, name, date and time information, and ownership and security information. Within a REST based system the identity of a data object is the URI to that resource, e.g., https://mandiant/workspaces/1/documents/all/99. Identities are unique within the system. Each identity describes one and only one data object, and each data object has one and only one Identity. A name for an object may be defined by users and are typically included for end user purposes. Note that a name is not an identity. Much like human names, it may not be unique—several objects could be named the same thing, while each would have its own unique, individually referenced, identity. Date and time information includes creation date/time, modification date/time, and any other temporal data about (as opposed to within) an object. Ownership and security information includes definitions for which user "owns" an object, and which users may access, modify, or delete an object.

Content is the data within the data object in question. For example, the content of File Listing Audit, it would contain a list of files. For a file acquired from a target system's hard drive, it would be the content of that file (a word processing document, an executable program, an email, etc).

Data is stored within the system using a combination of "document on a file system" and "data within a relational database" techniques, depending on the functionality requirements for the data. Note, however, that this is not a strict requirement of the present invention. The methods described may be used in some embodiments. Other mechanisms that support an implementation of a REST-based software architecture may be utilized in other embodiments. For example, all information could be stored within a relational or object-oriented database. The usage and performance requirements drive the selection of the specific data storage and management architecture.

In one embodiment of the present invention, most information is stored within a file on the controller, with identity and reference information stored within a relational database to support rapid lookup. Both content and metadata are kept within XML files on disk, while relationships between objects (e.g. "the list of objects an attribute is applied to") are stored within a relational database.

Figure 15:
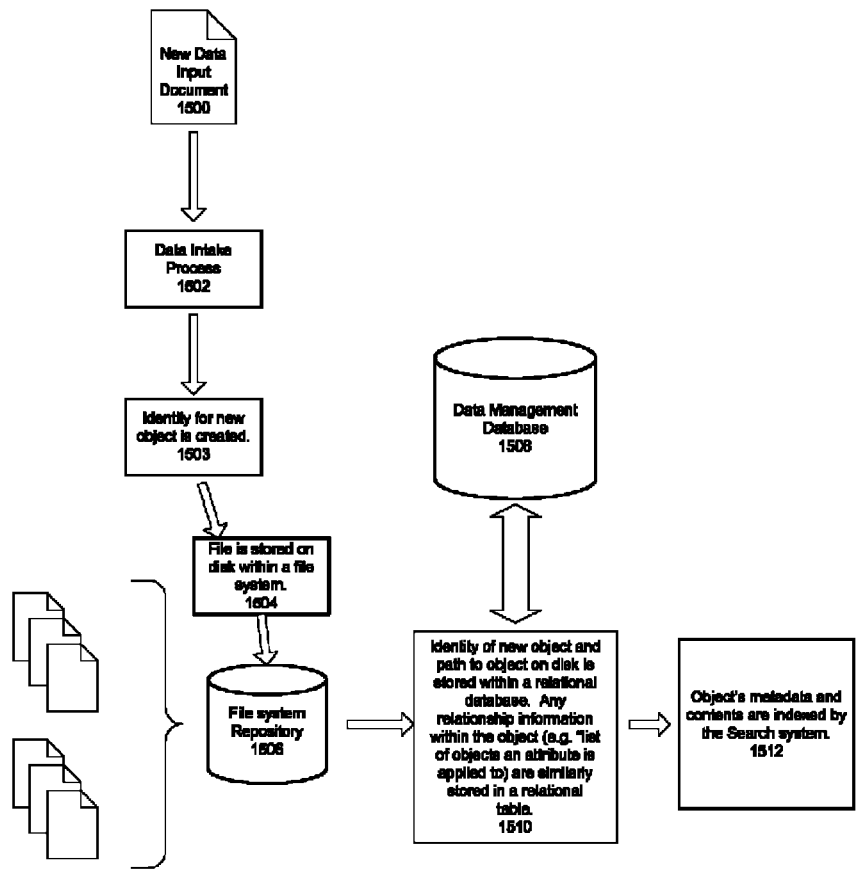

FIG. 15 illustrates this process. A new input data document 1500 is submitted to the data intake process 1502 in which an identity for a new object is created. The file is stored on a disk within a file system repository 1504 in a step 1506. The identity of the new object, path to the object on disk, and relationship information within the object are stored within a relational database in a database management system 1508 in a step 1510. The object's metadata and contents are indexed by the search system in preparation for a search in a step 1512.

As previously mentioned, in one embodiment of the invention, most content is stored on the file system of the controller. However, there are many situations when the console may need to access portions of the information contained in a data object as opposed to the entire object itself. This is most common when a data object is large, containing either a significant amount of data or in the case of record oriented content, a large number of rows. In these cases retrieving the entire object at once may create performance issues, bottlenecking controller performance, computer network performance, or console performance as it attempts to organize data to render it visually for an end user. To overcome this problem the controller supports the concept of virtualization of data.

Virtualization is the process of organizing a data object such that portions of it may be returned to a requester based on a set of defined offsets. In the case of record-oriented data, the offsets might be specified as row numbers. In the case of non-row oriented documents (e.g., a binary file from a computer system), the offsets might be specified as byte-offsets within the document.

One embodiment of the invention provides this method through the use of a relational database. When a data object is requested by a console, the controller "virtualizes" it—that is, loads it into a relational database, automatically organizing it into tables and fields based on the data object's structure. The console can then query the relational database containing the data object, requesting subsets according to its requirements. For example, given a File Listing Audit containing 500,000 rows, the console might request several hundred rows at a time; given the constraints of user interface devices such as monitors, the user could only visualize a small set of rows at any given time. The console requests only the relevant set of rows that the user wishes to view, preventing the need to transfer large amounts of information between controller and console before those rows can be visualized.

If a data object has a well-defined structure (for example, if it is contained in a well-formed XML document), the controller has the ability to automatically load the document into a relational data table. If the data object follows a well defined schema that the controller has access to, more advanced query features can be made available to requesting entities—for example, the ability to sort according to data type rules (e.g., sort numerical field in ascending order) can be made available if the controller has explicit information about the schema the data object follows. If a schema is unavailable, the controller can "guess", extracting records from the XML document and placing them into fields that are compatible with, but perhaps not optimal for, the individual fields contained in each record.

Search engines provide capabilities for retrieving information stored on a computer system according to a series of search terms and modifiers collectively referred to as a search query. The most common form of search engines are those applied to searching information on the World Wide Web. Search engines are also commonly employed in various forms of software, from desktop applications to enterprise infrastructure systems.

The present invention provides search engine capabilities for finding information across any set of acquired or user-created information within the system. The search engine is embedded in the controller, and is tightly integrated with data storage services. Given the common use cases for the invention, the data sets stored and searched within the system could be quite large (on the order of terabytes of information). Given that, various data organization and management methods are employed within the system to balance performance and resource utilization within the controller environment.

One embodiment of the invention utilizes the Lucene search engine from the Apache Foundation; however, any search engine may potentially be adapted for use within the system. The description of the data organization and management methods will be in the context of Lucene data structures, but the generic concepts are potentially applicable across any search engine utilizing modern search methods.

The search system within the present invention is made up of four primary classes of components: search documents, indexes, stores, and search hives.

Search documents differ significantly from typical data object documents within the system. A search document is created, typically in memory, when the search engine begins to index a document. It is a container of information about the data object being indexed, and may be used to contain special information depending on the focus of the search index being created. It also contains all of the content of the original data object document being indexed. One or more search documents are created for each input document indexed by the search engine.

A search engine index is a set of data that is constructed from a corpus of information; its contents are organized to optimize the speed and performance of finding the subset of relevant documents within the corpus that match a search query. In order to add a new document to a search engine it is "indexed." Indexing is the process of analyzing a document and producing a set of information that can be used to respond to search queries. When a search query is submitted to a search engine, this subset serves as a substitute for scanning the entire original document. The information produced during indexing is merged into a search engine's index in order for it to be included in the scope of search queries sent to the search engine. Search engines may have one or many indexes that are reviewed when analyzing a search query. Indexes may be optimized for different forms of searches, depending on the goals of the system.

In the context of the invention's search system, a store is a group of indexes that are optimized for the same class of search queries. One embodiment of the invention utilizes two stores within the system: a metadata store and a content store. The metadata store contains indexes of metadata from all data objects within the system. The content store contains indexes of content from all data objects within the system. If a cluster of controllers are operating together, there will be one metadata store on the master controller for the cluster and multiple content stores (typically one per controller in the cluster).

A search hive is the collection of all stores within the search system. One embodiment of the invention utilizes a single search hive within any cluster of related controllers. That is to say, for any set of controllers in an embodiment of the invention, there will only be one active search hive. All searches requested by any component of the system or an end user are serviced by this single hive. It is made up of the entire set of search stores contained on all controllers in the cluster.

FIG. 16 depicts the search system component classes and their relationships. An input document 1600 will lead to the creation of a plurality of search documents 1602, a metadata index 1604, and a content index 1606. All of the documents are added to a search hive 1608 which includes a metadata store 1610 and a plurality of content stores 1612.

Figure 17:
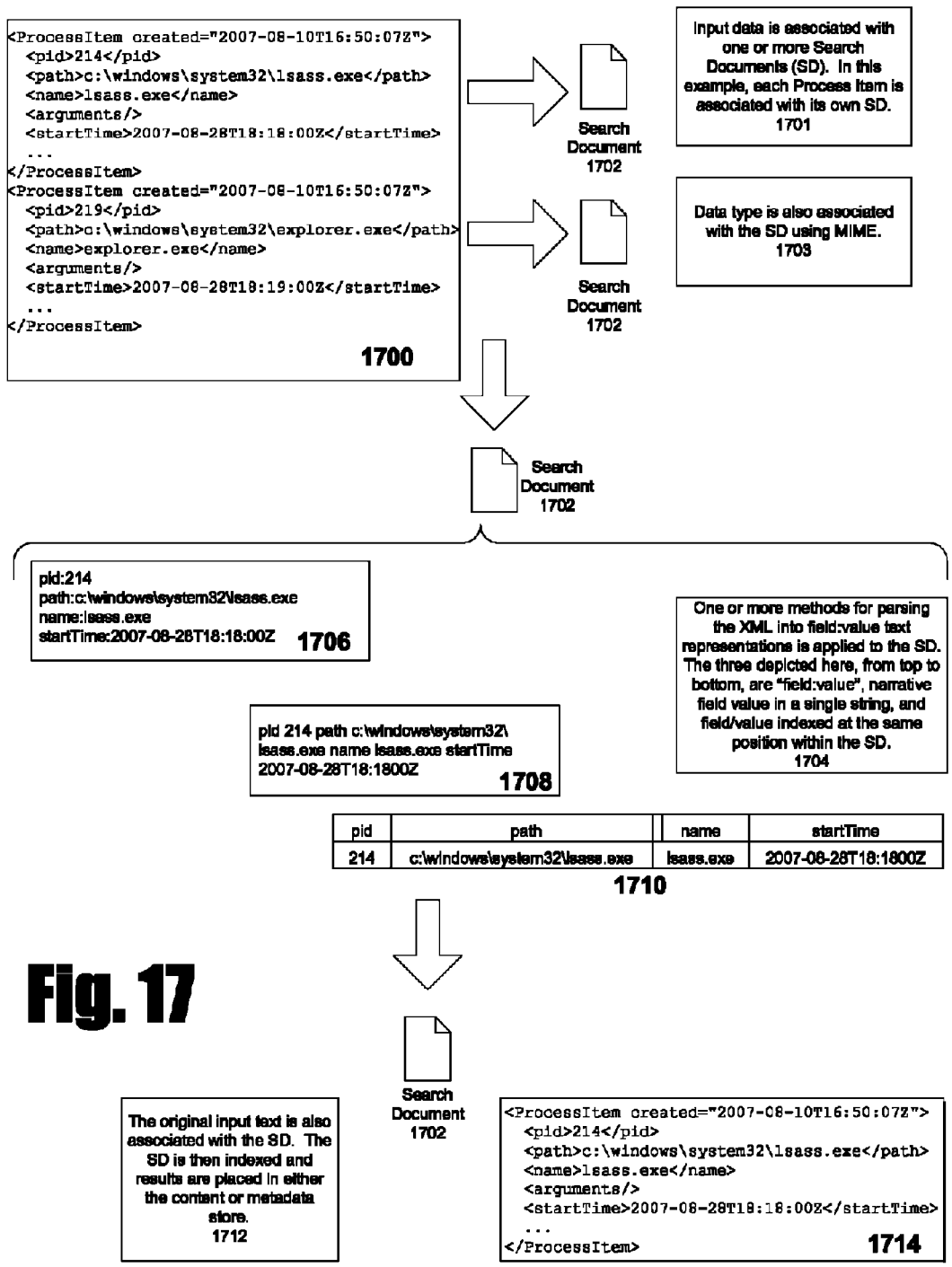

FIG. 17 depicts the structured data indexing process. Input data 1700 is associated with one or more search documents 1702 in a step 1701. In the example shown, each "processitem" is associated with its own search document. Data type may also be associated with the search document in a step 1703. The search document 1702 is then parsed into different data based on information in the search document 1702 in a step 1704. Three examples of parsing a search document are depicted in 1706, 1708, and 1710. The search document original input text is also associated with the search document, the search document is indexed, and the results are placed in either the content or metadata store in a step 1712. A portion of the original document as parsed is depicted in 1714.

The present invention deals with a significant amount of structured information—data that has an explicit schema and is represented in a well defined format. The search engine indexing process has been optimized so that search queries can ask specific questions about the structured information to obtain a more relevant set of results. By providing an index that is optimized around this structured information it is possible to respond to queries that would normally have to be handled by different technologies, such as a relational database. Indexing within the system is performed as follows. If the input data is unstructured, its contents are processed according to general indexing rules defined within a search engine such as the Lucene search engine. The results are placed within an index that is then associated with either the metadata store or the content store, depending on rule defined within the system for the data object. If the input data is structured, the XML is parsed and individual records are extracted for indexing. One or more search documents are created (the scheme can vary based on the goal of index optimization; in some instances a search document may be created for each individual record contained in the data to be indexed). For each individual record, information representing the "type" of the input data is applied to the search document. For example, one embodiment of the invention uses Multipurpose Internet Mail Extensions (MIME) to represent type information. The content of the individual record is parsed and an alternate representation may be created and placed in the search document to facilitate richer search query capabilities. This applies to records that have one or more field/value items within them (e.g. "port: 22", "pid: 967").

In one embodiment, a system according to the present invention may apply three separate indexing enhancement schemes. In the first scheme, XML is removed from the record and a plain representation of "field:value" is added to the search document. For example, "<pid>967</pid><port>22</port>" would become "pid:967" and "port:22". In the second scheme, the XML is removed from the record and a plain representation of "field value field value" is added to the search document. Continuing the example from above, "pid 967 port 22" would be a sample of this form of representation. In the third scheme, the XML may be removed and the field and value are added to the search document in the same "location." Location concepts within search documents are most commonly used for fuzzy matching—that is, configuring an index to respond to "similar" search queries as opposed to exact matches (e.g., if a user queries for "the quick brown fox", documents that contain "the fast brown fox" might also be returned). This same concept can be applied to enhance search queries that are trying to find explicit values associated with specific fields.

To complete the indexing, the original, unmodified record with full XML representation may be added to the search document. The search document is then indexed, and its results placed within an index that is then associated with either the metadata store or the content store, depending on rule defined within the system for the data object.

The method outlined above for addressing structured XML data can be accomplished by the search service even if schema is not present. The data need only be a well-formed XML document in order for search to "guess" at the proper structure for field/value pairs. If schema is also present, then stronger typing information about individual fields can be added to the shared document as it parses individual records.

Figure 18:
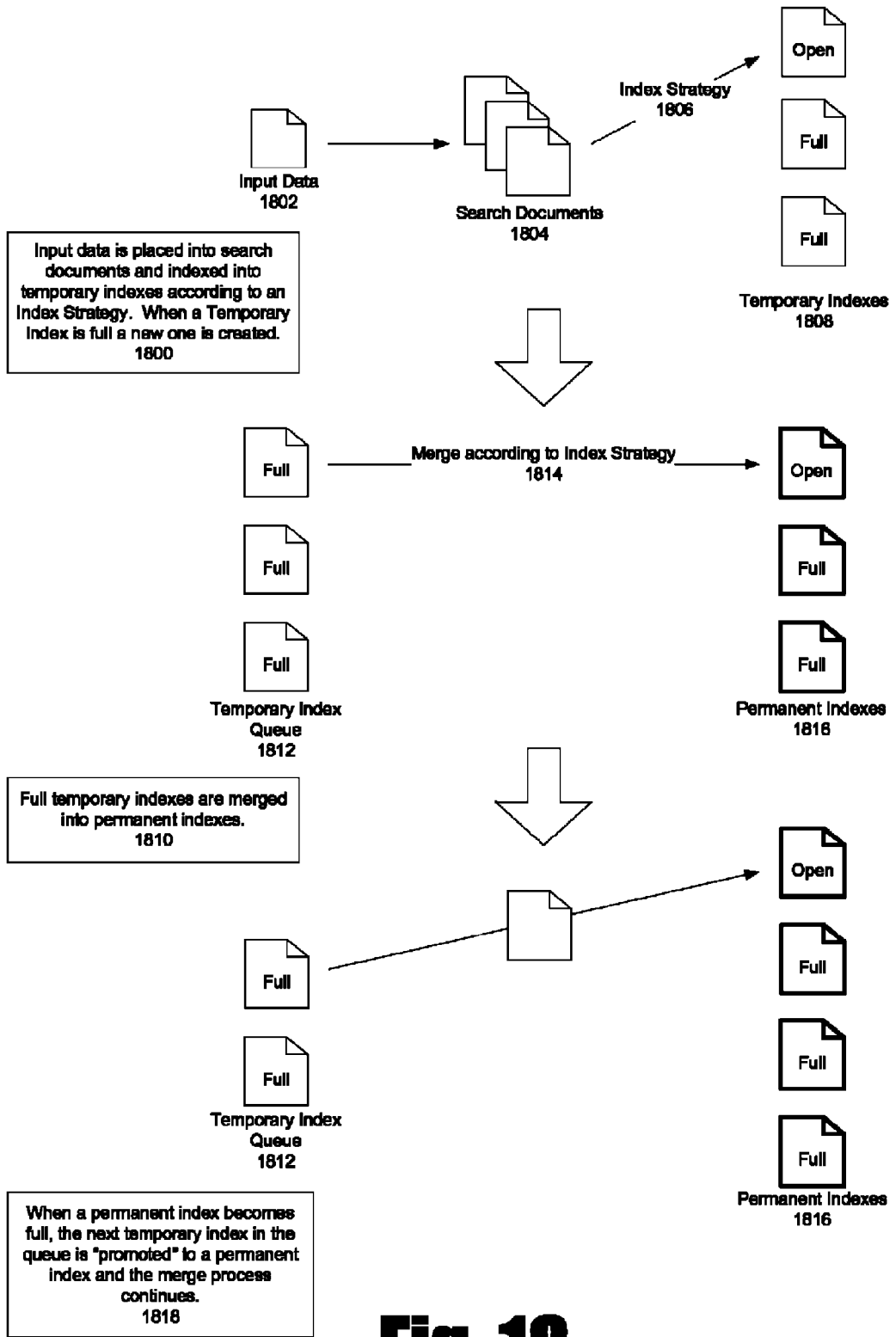

FIG. 18 illustrates one embodiment of the indexing process. Input data 1802 is placed into search documents 1804 and indexed according to an index strategy 1806 into temporary indexes 1808 in a step 1800. Full temporary indexes in a temporary index queue 1812 are merged according to an index strategy 1814 into permanent indexes 1816 in a step 1810. When a permanent index 1816 becomes full, the next temporary index in the temporary index queue 1812 is promoted into a permanent index 1816 in a step 1818.

There are several performance challenges when managing the process of indexing. In general, it is less burdensome to add new items to small index and more burdensome to add items to a larger index. However, it is often more burdensome for a search engine to look up results across multiple smaller indexes than it is for a search engine to look up results in a single large index. To balance the impact of these characteristics, the present invention implements an index management method that optimizes the performance of creating new indexes from input data, and then amortizes the cost of merging those indexes into fewer, larger indexes to increase search engine performance. The present invention also tracks unused indexes so that an index that is not used by the search engine to resolve queries for some predetermined period of time or number of total queries processed, or a combination of the two, may be removed to free up additional system resources for other uses.

The process of index management is performed within the search service on the controller as follows. This process is illustrated in FIG. 18. First, as input data is indexed, document content is indexed into a temporary index according to an index strategy. The index strategy is a set of parameters that governs how a temporary index may be divided and processed. Examples of parameters and criteria for dividing an index include, but are not limited to the number of rows from a structured set of input data (e.g., record oriented XML) that should be contained in a single search document, the number of search documents that should be created in memory before being indexed and written to disk, and/or the number of search documents that should be indexed within a single temporary index before a new temporary index is created.

The input data may be indexed into an existing temporary index if that index is not already at a threshold that calls for the creation of a new temporary index. If a threshold is crossed, a new temporary index is created and the input data indexed into it.

Second, if a new temporary index was created, it is added to a queue of temporary indexes that have been made available to the search engine. The search engine is able to search across all temporary indexes and all permanent indexes.

Third, an index management process reviews the queue of temporary indexes, "grabs" the index at the front of the queue, and begins to merge the temporary index (presumably a small index, optimized for fast indexing) into a permanent index (presumably a larger index optimized for fast lookups). Both the temporary index being processed and the permanent index being merged into are available to the search engine for queries during this time.

Fourth, if the permanent index crosses a defined threshold defined in its Index Strategy, it is closed for writing/merging. The next temporary index in the processing queue is converted into a permanent index (a process that simply involves changing the definition of the temporary index; none of its contents need to be processed during this conversion), and is then used for subsequent temporary index merges.

The present invention provides services for analysis of data within the system once it has been created or acquired. Analysis is a series operations performed on existing data (inputs) which produces another set of data that may be comprised of elements or derivatives of the original inputs. The present invention provides a method for users to specify inputs, select analytical operations to perform on those inputs, specify parameters for those analytical operations, and receive and view results.

One embodiment of the invention provides this capability through a dedicated service which functions as a component of the controller. The analysis service is able to communicate directly with all elements that comprise the controller, including those that process jobs received from users, interact with deployed agents, store data collected from agents, index and search data within the system, and "virtualize" documents within the system into relational tables. The analysis service may utilize any of these in combination to perform operations requested by the end user.

Individual analysis modules, called analyzers, provide the logic necessary to implement one or more analysis commands. Analyzers are built on top of an extensible framework, allowing additional analyzers to be written based on a definition of a desired analysis result. The function of the analyzer is to define a series of required inputs, perform any necessary transformations on those inputs to organize them for analysis, use a core set of analysis functions to further transform or organize the data, use a set of custom analysis functions defined within the analyzer, and perform a final transformation into one or more output documents. Each step is described in more detail below:

Analyzers define and retrieve inputs. Analyzers may specify a number and type of inputs. One input will always be a data object within the system. Inputs may also be a set of arguments and parameters that further describe operations to be performed on the input. For example, for a time skew analyzer, the inputs may be one or more documents that contain time data along with an argument indicating how much time to skew each document by. Once inputs are defined, the Analyzer retrieves them and moves to the next step of the analysis.

Analyzers transform inputs. In order to perform certain analyses, inputs may need to be transformed—their representation may need to change in order for additional analysis steps to be performed. In some situations the transformation of the inputs may be the analysis in its entirety, with no additional steps in the process required except production of output. Most analyses will require some form of input transformation. Transformations could be a simple restructuring of the XML document containing an input (e.g. extracting data from one XML document to create another XML document that adheres to a different schema). A transformation may also involve changing the storage representation of an input so that a different technology can be applied in subsequent analysis steps. For example, if an analysis calls for relational operations, any XML document inputs will likely have to be parsed and loaded into one or more relational database tables.

Analyzers may perform core analysis. The analysis service provides a series of core functions that any analyzer may use to conduct analyses. These core functions are fundamental operations that are common across many different classes of analysis problems, several of which may require relational representations of the inputs in order to be performed. The following fundamental operations may be performed: union, intersection, difference, and equality. Note these are not exclusive; other core functions could be defined and included in the core of the analysis service. A union analyzes two sets of data X and Y, the union of X and Y contains all the data in X, all the data in Y, but nothing else. An intersection analyzes two sets of data X and Y, and creates a data set containing the intersection of X and Y that is all the data in X that is also in Y. A difference analyzes two sets of data, X and Y, and creates a data set containing the difference of Y and X which is the set of data in Y but not in X. An equality analyzes two sets of data X and Y, and creates a data set containing data contained in set X and set Y and all data in set Y is also in set X.

Analyzers may perform custom analysis. Some analyzers may not be able to accomplish their objective through applying transformations and using core analysis services. In those instances, analyzers may directly implement the analysis logic themselves, using services within the system (such as virtualized data—that is, data stored in a relational database)

to accomplish this goal. Any capabilities required by the analyzer that are not implemented by the analysis service are fully implemented within the analyzer itself Analyzers transform outputs and write results. Once input transformations and core analysis is complete, the results of the analysis may need additional transformation, similar to input transformation above, before they can be written back into the system. For example, any results that are in a relational database table are transformed back into an XML representation. Results may also be transformed into a format required by a user. Once all results have been written into representations understood by the remainder of the system (e.g., XML documents), the analysis is complete.

Figure 19:
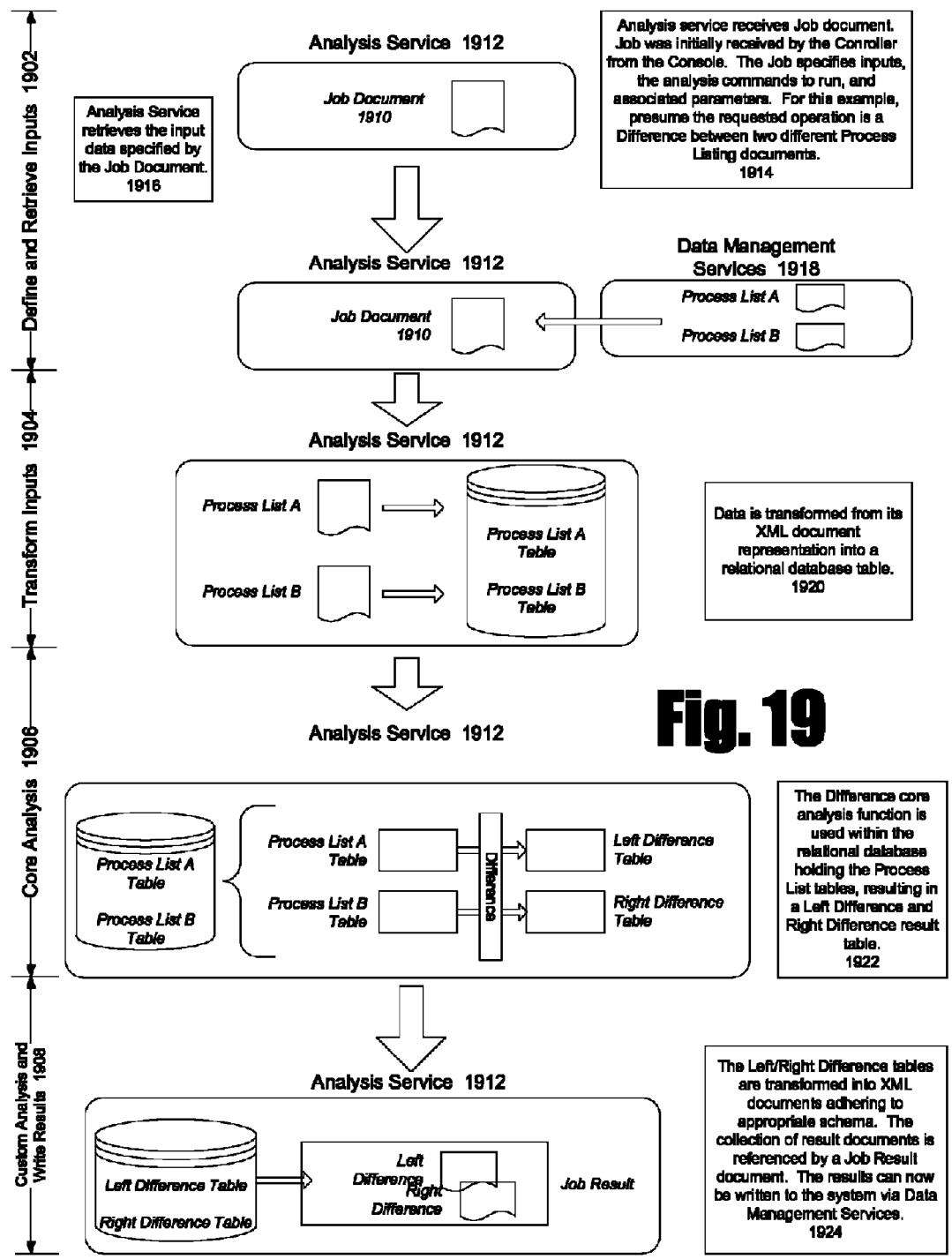

FIG. 19 illustrates the analysis service, the concept of modular analyzers, and the flow of an analysis through input definition, input transformation, core analysis, custom analysis, and output generation. The process depicted in FIG. 19 encompasses defining and retrieving inputs 1902, transforming inputs 1904, core analysis 1906, and custom analysis and recording of results 1908. A job document is received by an analysis service 1912 in a step 1914. The analysis service 1912 retrieves the input data specified by the job document 1910 in a step 1916 which may be process list A and process list B from data management services 1918. Data is transformed from its XML document representation into a relational database table in a step 1920. The difference core analysis function is used within the relational database holding the process list tables, resulting a left difference and right difference result table in a step 1922. The left and right difference tables are transformed into XML documents adhering to appropriate schema in a step 1924. The collection of result documents is referenced by a job result document. The results can now be written to the system using data management services.

A key element of the invention is the ability for multiple users to interact with the system at the same time. Given a set of controllers arranged as a cluster, users interacting with those controllers through a console are able to utilize all aspects of the system in a fashion that facilitates sharing of data, allows identification and understanding of changes and modifications made by other users, and prevents collisions or contention between resources that result in unexpected or non-deterministic changes within the system.

The fundamental functions of the present invention support this collaborative paradigm in the following fashion. For security purposes, users within the system may be identified in the system through the use of a unique identifier. The user, in their role as a trust domain entity (discussed above), directly authenticates into the controller cluster. Every operation undertaken by the user is marked in audit records within the controller such that all creation of new data or changes to existing data can be associated with a given user.

Data is acquired through the agent. Users may launch jobs to acquire data from agents simultaneously. The controller job management methods provides queuing, scheduling, and binding of data results to specific job request such that multiple requests from multiple users to the same agent will result in separate sets of acquired data responsive to each user's request.

Much like data acquisition, multiple users may conduct analysis simultaneously. Controller job scheduling results in analysis resources being shared across jobs as they are received by the controller. Note that a job to conduct analysis is self-contained—all of the data inputs necessary to conduct the analysis must either already exist, or must be produced by initial steps contained within the analysis job itself. This is in keeping with the stateless paradigms discussed in the section on data representation and access.

The present invention follows stateless paradigms as discussed above in connection with data representation and access. As such, any time data is modified (this includes the creation and deletion of data), the "current" state of the data reflects the state after the last modification made. Each request for modification is fully self-contained and does not require multiple transactions from several requests from a modifier (e.g., a single request or "transaction" from the console to the controller contains all the information necessary to perform a modification). Each update operation is, in essence, atomic—that is to say the series of actions necessary to modify data within the system appear to the rest of the system as a single operation with only two possible outcomes: success or failure.

The present invention also supports state updates. While the present invention is in essence stateless, and follows REST-based methods for software architecture as discussed above, it does provide some facilities for clients (e.g., the console) to portray a more detailed state picture for the end user. The controller and all of its associated subsystems publish a stream of information about changes within the system. The system utilizes syndication feed technology such as Atom to publish a feed of changes and updates within the system. In keeping with REST software methods, the controller does not infer any complex state based on this stream of updates. Instead, a client must consume the feed and make its own determinations on how it wishes to use those to update a user's view of system state.

The present invention provides for searching within the system is possible by multiple users at the same time. Additionally, the search engine is responsive while indexing operations are ongoing. Users receive results for indexes that are currently available to the system. If a document is partially indexed, those partial results are available to end users.

Given these considerations, the present invention provides several facilities to further allow users to collaborate when collecting, analyzing, or presenting information during the course of an EED or computer security incident. These include data markup and organization, reporting, and detailed auditing.

A common method to perform data collection, analysis, and minimization is to divide tasks among available resources (e.g., investigators or analysts), and to collate results centrally. Investigators and analysts may be more familiar with certain sections of acquired or analyzed data; it is common to have someone cross-check or re-check findings based on their expertise or focus.

Working in this fashion requires several different methods of data organization. Users may wish to organize all findings for a particular computer security or EED incident into a case—a logical organization of related information pertaining to the events at hand (e.g., "a case file"). Users may also wish to perform more ad-hoc organizations, marking data according to any number of factors. Users may wish to identify elements of an ad hoc workflow associated with data, conclusions reached during review, relevance, or any other number of factors. In fact, one of the primary challenges in a system addressing this form of problem is the incredible variance of ways end users wish to organize and mark information.

To that end, the invention provides facilities for arbitrary markup of acquired and analyzed data. The system implements the concept of attributes. An attribute is additional data that can be attached to any entity within the system. Attributes typically store small amounts of data, such as a label (e.g., "evil", "evidence", "mark's work"). When an attribute is de-referenced (examined to identify all entities it is attached to), sets of data that the attribute was applied to are returned to the requestor. This provides a powerful method for both structured and ad-hoc data organization within the system.

One embodiment of the present invention provides three primary attribute concepts: labels, properties, and notes. Other attribute concepts are possible provided they meet the primary requirement of being data that can be attached to any entity within the system.

Labels are typically text strings that allow the end user to "label" an entity (e.g. a row of data within an audit returned from an agent, a document within the system, a group of documents that are related to each other). Labels are typically short text strings (though they could be "long" if so desired) that provide organizational or status cues to the end user. Examples would include "case" labels (e.g., "Aug. 16, 2007: Fraud Case"), work status ("reviewed", "completed"), and analytical conclusions ("evil", "malware", "clean"). Users could apply labels in a variety of ways tailored to their particular workflow or process.

Properties are labels with an associated value (e.g., "complete=10%"). They provide a method to communicate a more discrete set of information than a label, while still carrying all of the characteristics of an attribute within the system—it can be applied to any entity, and de-referencing it produces a set of data that the property is attached to.

Notes are simply free-form text. They could be thought of as a "long" label, but might be used to contain more detailed information about the object they are attached to. Notes are typically more descriptive than labels, with their primary purpose being more content oriented than organizational.

Attributes are data objects within the system, just like other entities such as Documents and Audit Results. Attributes share the same REST properties as other data types—they are directly addressable via a URI, their data is formatted and stored using XML according to a specific schema, and all operations conducted against an attribute (creation, deletion, or modifying it such that it is attached or "applied" to another data object) are stateless, atomic transactions.

Attributes store a number of data elements that describe both their own content (e.g., their name, their identity), and the objects they are applied to (e.g., a list of URIs to other objects in the system). The list of objects an attribute is applied to is, in essence, a container and is represented using a syndication feed, such as an Atom feed, while being stored in a relational database table.

In order to support the concept of "attributing" individual row items within a document—for example, a series of file items within a file listing audit—an additional data object exists within the system called a markup. Markups store information about rows within a document that have a particular attribute applied to them. There are two possible methods for utilizing markups for row item attribution within the system: explicit use of markup as a directly attributed object, and one-to-one markup-to-object mappings such that one markup contains all row item attribution information for a single corresponding data object.

In a directly attributable markup, the markup data object stores information about a group of rows within a document. It contains the identity of the document it is applied to and information about a set of rows within that document. The markup may then have an attribute applied to it.

In a one-to-one markup, the markup is directly associated with a data object. The data object includes the URI of its corresponding markup object. The markup object contains information about all rows within the data object that are grouped as a "set", and it also identifies the URI of the attribute that is applied to those rows.

An embodiment of the invention will typically select one method to use globally for row item attribution throughout the system—either directly attributable markup or one-to-one markup.

The presence of an attribute on an object or series of row items is important information that users may wish to have displayed in a number of different contexts, depending on the user's purpose for the attribute. The context of the attribute must be understood in order to understand the most useful method to utilize when presenting it to a user. It may not be possible to determine the user's desired presentation for a given attribute at the time it is created. Therefore, the present invention provides two primary methods for presenting attribute information to end users, allowing the user to choose the most relevant context according to their needs.

In one implementation of the invention, labels are the primary attribute capability provided to users. Labels may be used in one of two contexts: organizational or as virtual data for a data object.

Figure 20:
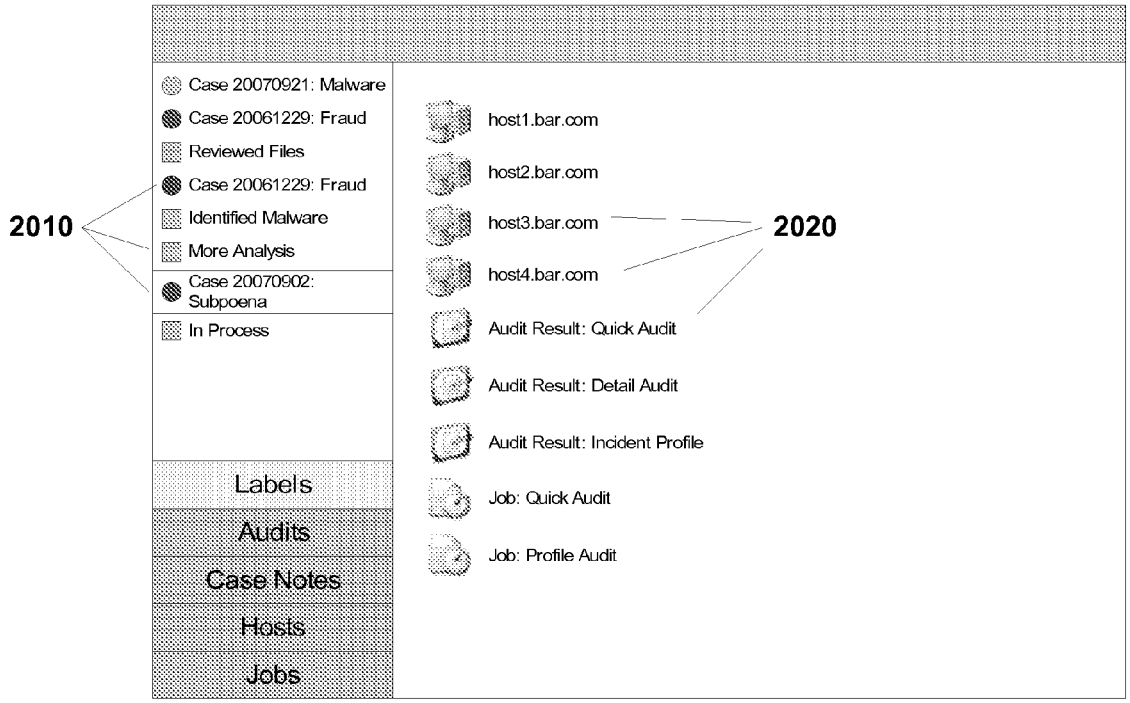

As discussed above, when an attribute such as a label is de-referenced (that is, examined to view its contents), it provides a list of objects in the system that it is applied to. This is analogous to the concept of a "folder", or other form of data container on a computer system—for example, a "directory" on a computer file system provides a similar capability. The present invention provides a view into the system that presents a list of labels that the user can select. When the use selects a label, the contents of that label—the list of objects the label is applied to—is rendered for the end user. FIG. 20 illustrates one possible method for visualizing labels 2010 and the data they are applied to 2020 in an organizational context.

Labels may also be virtual data. Labels may sometimes be used to add information to an object. The user wants to be reminded about that extra information when they view the data item. In one embodiment of the invention, the concept of virtual columns is used. The data object is displayed to the user; if a label has been applied to the object, an element is added to the display that shows the label has been applied to that object. When the view into the object is in a grid (much like a spreadsheet), a column is added to the display that contains this information. In the case where multiple data items are being viewed, all objects in that view containing the label are appropriately marked, with the name of the label serving as the column header. FIG. 21 illustrates one possible method for visualizing labels and the data they are applied to in a virtual data context.

During the investigative process for either electronic discovery or a computer security incident, investigators and analysts need to record their results and observations. Such records are often collected in the form of a document or series of documents, and include snippets of acquired data, analytical results, and the conclusions of the investigator based on their personal experience and observation. The present invention provides a method for users to record this data within documents and do so in a fashion that allows for collaborative editing and sharing of these records.

Figure 22:
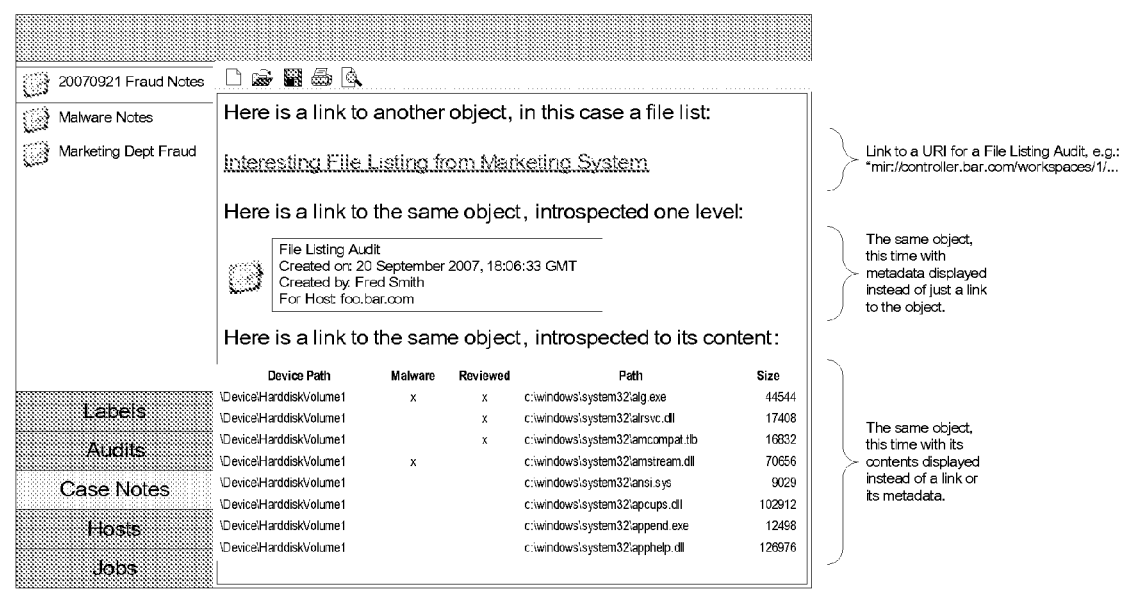

Report documents may link to data within the system. In one embodiment, users may create Extensible Hypertext Markup Language (XHTML) based documents. The system refers to these as case notes; however, they are simply documents that permit semi-arbitrary input of user content. Users can directly edit content within the document by using the console portion of the invention. In addition to typical word-processing/HTML editing features, users can insert hyperlinks to any data object within the system—since the entire system is REST based and all objects have a URI, any of those URIs can be embedded within the body of a case notes document. When links are embedded in the document, they can either be viewed as a standard hyperlink, or expanded to represent a portion or the entire object they reference based on the user's preference. If a user clicks on those links, the console retrieves the content of that link and displays it to the end user, much like a web browser. FIG. 22 illustrates this concept.

Any user of the system with access to a given case notes document can open it for editing. A unit of collaboration (UC) is the smallest unit of content which may be edited by more than one user at a time. When the user saves (or "commits") the case notes document, the collaboration engine (CE) tests whether the authority UC (the UC in storage on the controller) is newer than the working UC (the UC the end user is editing and wants to commit). If not, the commit continues (the working UC is strictly newer than the authority UC). Otherwise, the commit fails and the user is prompted for action, given a means to update the working UC to the authority UC (losing their changes), commit their copy anyway (overwriting the current authority UC), or save the working UC to a different document for manual merging later (its content is marked as a derivative of the authority UC to simplify merging later). One embodiment of the invention places the collaboration engine in the console; however, it could also be implemented within the controller.

Another embodiment of the invention can provide a more advanced method for collaborative editing that utilizes versioning. Every commit of a document is a revision and older revisions may be accessed individually. Deletion is a revision which marks the resource deleted so that previous revisions may still be retrieved. Conflict resolution is as above but enhanced by the ability to "optimistically" commit the working unit of collaboration immediately, persisting changes, then retrieve a previous revision to merge (if necessary). Further, the cost of an erroneous commit is reduced by the ability to manually (or automatically) roll back to a previous revision. These methods are similar to those used by source code control systems such as Subversion.

To further reduce the occurrence of such conflicts, a case notes document is a master document containing one or more sections, each of which is a unit of collaboration. The scope of a user's edits and commits are across a single section at a time, making it possible for multiple users to simultaneously edit a single document made up of multiple sections.

One implementation of this model would use a syndication feed of entries. The entries in the feed reference their source documents via relationship links; none contain content (although they may contain summary data which provides a read-only view into the target's current content). When rendering a document (such as case notes), all sections are retrieved individually and asynchronously. Read-only feed consumers (such as supervisors or off-unit audit services) may retrieve the data in its native syndication feed format.

Within a document, a section is any new titled content. A section is a collaboration atom, as above. Edit locking is maintained on the client so that the section the user is "editing" (where the user's input cursor is) is locked for updates but other sections can be updated live while the user is working in the document. If no changes have been made to a section, it becomes unlocked for updates as the user exits it and enters another section. Section generation can be transparent to the user (whenever a heading is created) or manual (similar to a threaded discussion where a user clicks to insert a 'reply' between previous sections).

All of the above is designed to provide a conservative, stateless user experience where even disconnected work is possible. As that may yet be inadequate to provide a good user experience, a controller mechanism which allows clients to publish to the common audit trail may provide editing notification, similar to the controller's use of a syndication feed such as Atom to update consoles to changes within the system. Using that mechanism, an audit trail event is posted by a client when a user begins editing a unit of collaboration or cancels an edit (other operations, such as a commit, are already properly published).

Since a commit of a unit of collaboration is reported via the audit trail, the user may be immediately notified (with a non-modal status change) that the Working UC they are editing is out of date, giving them the option to resolve via the process above.

As these and other variations and combinations of the features discussed above can be utilized without departing from the present invention as defined by the claims, the foregoing description of the preferred embodiment should be taken by way of illustration rather than by way of limitation of the invention set forth in the claims.

The invention claimed is:

1. A method of organizing and presenting data gathered in response to an event, the method being performed by one or more computers coupled to a network and comprising the steps of:
   (a) authenticating a plurality of memory sources by verifying whether a certificate presented by each of the plurality of memory sources is valid within a trust domain, each of the certificates indicating whether a respective one of the plurality of memory sources and all stored data of the respective one of the plurality of memory sources can be trusted;
   (b) in response to a successful authentication of the plurality of memory sources, importing the stored data from the authenticated plurality of memory sources into a first memory coupled to the network;
   (c) converting the stored data into a specified format to produce uniform data, the specified format being one of general purpose markup language and plain text format, the stored data providing a relational comparison between sets of the stored data;
   (d) providing an interface to a user through which the user requests a search of the uniform data; and
   (e) presenting one or more subsets of the uniform data to the user in response to the request from the user,
   wherein,
      the event is one of (i) a request for production of documents, and (ii) a data security breach.

2. The method of claim 1 wherein the plurality of memory sources are coupled to the first memory through the network.

3. The method of claim wherein the plurality of memory sources are servers.

4. The method of claim 1 wherein the uniform data is stored in a database prior to the request from the user.

5. The method of claim wherein the stored data comprises both content and metadata.

6. The method of claim 1 wherein the interface is provided to a plurality of users through the network.

7. The method of claim 1 wherein the request for production of documents is in a legal process.

8. The method of claim 1, further comprising the step of:
   creating a certificate authority in response to the event, the certificate authority (i) configured for use by the trust domain, and (ii) operable to create and sign each of the certificates.

9. The method of claim 8, wherein the verification is based at least in part on a certificate revocation list published by the certificate authority.

10. The method of claim 1, wherein the stored data is described in a schema form for the relational comparison between the sets of the stored data.

11. The method of claim 10, wherein the schema form is a description of the data using a syntax.

12. The method of claim 1, wherein the plurality of memory sources are disk drives.

13. The method of claim 1, further comprising the step of:
installing an agent on the at least one memory source of the plurality of memory sources, the agent configured to connect to an agent discovery service.

14. The method of claim 13, wherein the agent is configured to transmit the certificate to the agent discovery service.

15. The method of claim 1, wherein the first memory is a form of removable media operable to permit installation of the stored data on a system.

16. The method of claim 15, wherein the form of removable media is a USB memory storage key, an externally-connected hard drive, or a floppy disk.

17. A method of organizing and presenting data gathered in response to an event, the method being performed by one or more computers coupled to a network and comprising the steps of:
(a) installing an agent on at least one of a plurality of memory sources;
(b) presenting a certificate from the at least one of the plurality of memory sources via the agent;
(c) authenticating the at least one of the plurality of memory sources by verifying whether the certificate presented by the at least one of the plurality of memory sources is valid within a trust domain, the certificate indicating whether stored data of the at least one of the plurality of memory sources can be trusted;
(d) in response to a successful authentication of the at least one of the plurality of memory sources, importing the stored data from the at least one of the plurality of memory sources into a first memory coupled to the network;
(e) converting the stored data into a specified format to produce uniform data;
(f) providing, via a computer coupled to the network, an interface to a user through which the user requests a search of the uniform data; and
(g) presenting one or more subsets of the uniform data to the user in response to the request from the user, wherein,
the event is one of (i) a request for production of documents, and (ii) a data security breach.

18. The method of claim 17, wherein the plurality of memory sources are coupled to the first memory through the network.

19. The method of claim 17, wherein the plurality of memory sources are servers.

20. The method of claim 17, wherein the specified format is one of general purpose markup language and plain text format.

21. The method of claim 17, wherein the stored data providing a relational comparison between sets of the stored data.

22. The method of claim 17, wherein the uniform data is stored in a database prior to the request from the user.

23. The method of claim 17, wherein the stored data comprises both content and metadata.

24. The method of claim 17, wherein the interface is provided to a plurality of users through the network.

25. The method of claim 17, wherein the request for production of documents is in a legal process.

26. The method of claim 17, further comprising the step of:
creating a certificate authority in response to the event, the certificate authority (i) configured for use by the trust domain, and (ii) operable to create and sign the certificate.

27. The method of claim 26, wherein the verification is based at least in part on a certificate revocation list published by the certificate authority.

28. The method of claim 17, wherein the stored data provides a relational comparison of data.

29. The method of claim 17, wherein the stored data is provided in a schema form with a description of the data using a syntax.

30. The method of claim 17, wherein the agent is configured to connect to an agent discovery service.

31. The method of claim 30, wherein the agent is configured to transmit the certificate to the agent discovery service.

32. The method of claim 17, wherein the first memory is a form of removable media operable to permit the installation of the stored data on a system.

33. The method of claim 32, wherein the form of removable media is a USB memory storage key, an externally-connected hard drive, or a floppy disk.

* * * * *